(12) United States Patent
Tani et al.

(10) Patent No.: US 8,724,127 B2
(45) Date of Patent: May 13, 2014

(54) OPERATION CONSOLE, CONTROL METHOD THEREOF AND IMAGE FORMING APPARATUS

(75) Inventors: Takeshi Tani, Osaka (JP); Mayuko Yoshida, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 223 days.

(21) Appl. No.: 13/237,096

(22) Filed: Sep. 20, 2011

(65) Prior Publication Data
US 2012/0079411 A1  Mar. 29, 2012

(30) Foreign Application Priority Data
Sep. 28, 2010  (JP) .................................. 2010-216862

(51) Int. Cl.
*G06F 15/00*  (2006.01)

(52) U.S. Cl.
USPC ......................................................... 358/1.13

(58) Field of Classification Search
USPC .......................................................  358/1.13
See application file for complete search history.

(56) References Cited

U.S. PATENT DOCUMENTS

| 6,798,530 B1 * | 9/2004 | Buckley et al. ............... 358/1.13 |
| 2002/0080376 A1 | 6/2002 | Momose et al. |
| 2010/0020363 A1 | 1/2010 | Yoshida et al. |

FOREIGN PATENT DOCUMENTS

| JP | 09-097155 A | 4/1997 |
| JP | 10-222328 A | 8/1998 |
| JP | 2002-182871 A | 6/2002 |
| JP | 2007-329535 A | 12/2007 |
| JP | 2008-046366 A | 2/2008 |
| JP | 2010-034691 A | 2/2010 |

* cited by examiner

*Primary Examiner* — Saeid Ebrahimi Dehkordy
(74) *Attorney, Agent, or Firm* — Edwards Wildman Palmer LLP; David G. Conlin; David J. Silvia

(57) ABSTRACT

In an operation unit, a display panel displays a two-sided copy setting screen image including a still image display area on which a plurality of software keys (two-sided copy setting keys) corresponding to respective ones of a plurality of processes (one-sided/one-sided copy process, one-sided/two-sided copy process, two-sided/two-sided copy process and two-sided/one-sided copy process), for selecting any of the plurality of processes, are displayed. A touch-panel receives an input operation to the plurality of software keys. In response to the touch-panel receiving the input operation, a CPU displays, on a movie display area different from the still image display area of the two-sided copy setting screen image, an image representing contents of the selected process in a prescribed state.

14 Claims, 16 Drawing Sheets

OPERATION CONSOLE, CONTROL METHOD THEREOF AND IMAGE FORMING APPARATUS

CROSS-REFERENCE TO RELATED APPLICATION

This nonprovisional application claims priority under 35 U.S.C. §119(a) on Patent Application No. 2010-216862 filed in Japan on Sep. 28, 2010, the entire contents of which are hereby incorporated by reference.

BACKGROUND OF THE INVENTION

1. Field of the Invention

The present invention relates to an operation console and an image forming apparatus and, more specifically, to a technique of displaying an image representing contents of a process.

2. Description of the Background Art

Conventionally, image forming apparatuses capable of executing two-sided copy in addition to one-sided copy from one-sided document (hereinafter referred to as one-sided/one-sided copy) have been known. The two-sided copy includes two-sided copy from one-sided document (hereinafter referred to as one-sided/two-sided copy), two-sided copy from two-sided document (hereinafter referred to as two-sided/two-sided copy), and one-sided copy from two-sided document (hereinafter referred to as two-sided/one-sided copy). In such an image forming apparatus, a technique of indicating by icons the contents of the aforementioned two-sided copy processes has been known.

By way of example, Japanese Patent Laying-Open No. 2010-34691 (hereinafter referred to as '691 Reference) discloses an image forming apparatus. In the image forming apparatus, on a screen image for setting two-sided printing displayed on a touch-panel, one-sided/one-sided key, one-sided/two-sided key, two-sided/two-sided key and two-sided/one-sided key as well as icons representing contents of processing corresponding to respective keys are displayed.

Japanese Patent Laying-Open No. 2007-329535 (hereinafter referred to as '535 Reference) discloses an image forming apparatus. In the image forming apparatus, on an icon display area of a basic screen image displayed on an operation display unit, a document icon representing the state of setting conditions related to two-sided document, and an output icon representing the state of setting of conditions related to two-sided print output are displayed, together with an arrow correlating these icons.

The techniques disclosed in '691 and '535 References display by icons the contents of respective two-sided copy processes. Only with such icons, however, it is still difficult for the user to understand the contents of two-sided/one-sided and one-sided/two-sided copy processes.

SUMMARY OF THE INVENTION

In view of the problem described above, it is desirable to provide an operation console and an image forming apparatus allowing the user to easily understand the contents of processes.

According to a first aspect, the present invention provides an operation console provided on an apparatus that executes a plurality of processes. The operation console includes: a display unit displaying a display screen image including a first area on which a plurality of virtual keys corresponding to respective ones of the plurality of processes for selecting any of the plurality of processes are displayed; a receiving unit receiving an input operation to the virtual keys; and a first display control unit responsive to the receiving unit receiving the input operation, for displaying, on a second area different from the first area of the display screen image, an image representing contents of the selected process in a prescribed state.

As described above, if any of the plurality of processes is selected, an image representing the contents of selected process is displayed in a prescribed state on the second area different from the first area on which the plurality of virtual keys are displayed. Therefore, it is possible for the user to easily understand the contents of selected process.

Preferably, the first display control unit displays the image representing contents of the selected process in a movie. Since the contents of selected process are displayed in detail, the user can more easily understand the contents of the selected process.

More preferably, the operation console further includes a second display control unit for displaying, next to one of the virtual keys in the first area, an icon indicating contents of processes corresponding to the one of the virtual keys. Therefore, by looking at the icon, the user can confirm the contents of the process corresponding to the virtual key, before selecting a desired process. Therefore, user convenience can be improved.

Further preferably, the image representing contents of the selected process includes an enlarged image of the icon indicating contents of the corresponding process. Therefore, it becomes easier to grasp the contents of the selected process. As a result, the user can more easily understand the contents of the selected process.

Preferably, the second display control unit includes a display changing unit, responsive to the receiving unit receiving the input operation, for displaying the icon in a prescribed less visibly recognizable manner. Therefore, if any of the plurality of processes is selected, the user more likely pays attention to the image indicating the contents of selected process displayed in the prescribed state, than the icon. Thus, it becomes easier for the user to understand the contents of selected process.

More preferably, the operation console further includes: an adding unit for adding a prescribed process to the selected process; and a reflecting unit for reflecting contents of the added process to the image representing the contents of the selected process. Therefore, the user can easily understand the contents of added process. Thus, user convenience can further be improved.

More preferably, the plurality of processes include at least: a one-sided/two-sided copy process for forming a two-sided copy from a one-sided document; and a two-sided/one-sided copy process for forming a one-sided copy from a two-sided document. Therefore, it is possible for the user to easily understand the contents of the above-described processes.

More preferably, the first display control unit displays, in response to the receiving unit receiving an input operation to the virtual key corresponding to the one-sided/two-sided copy process, images representing a state of images printed on two sides of a sheet of recording paper, as images representing contents of the selected process, in a prescribed state, on the second area. Therefore, it becomes possible for the user to easily understand the contents of one-sided/two-sided copy process, which are difficult to understand by icon display. As a result, user convenience can further be improved.

More preferably, the first display control unit displays, in response to the receiving unit receiving an input operation to the virtual key corresponding to the two-sided/one-sided copy process, images representing a state of two images of one two-sided document respectively printed on one side of two sheets of recording paper, as images representing contents of the selected process, in a prescribed state, on the second area. Therefore, it becomes possible for the user to easily understand the contents of two-sided/one-sided copy process, which are difficult to understand by icon display. As a result, user convenience can further be improved.

More preferably, the second area is provided next to the first area. Thus, it becomes easier for the user to recognize the image representing the contents of the selected process.

According to a second aspect, the present invention provides an image forming apparatus executing a plurality of processes including image processing of image data, including: the above-described operation console; and a process executing unit for executing a process selected by the operation console. Since the image forming apparatus includes the operation console described above, it is possible to prevent erroneous selection of a process different from the intended process by the user. Thus, using the image forming apparatus, the user can execute the desired process easily.

According to a third aspect, the present invention provides a method of controlling an operation console provided on an apparatus that executes a plurality of processes, including the steps of displaying a display screen image including a first area in which a plurality of virtual keys corresponding to respective ones of the plurality of processes for selecting any of the plurality of processes are displayed; receiving an input operation to the virtual keys; and displaying, in response to reception of the input operation, on a second area different from the first area of the display screen image, an image representing contents of the selected process in a prescribed state.

Preferably, the display in a prescribed state is display in movie.

More preferably, the control method further includes the step of displaying, next to one of the virtual keys in the first area, an icon indicating contents of processes corresponding to the one of the virtual keys.

Further preferably, the image representing contents of the selected process includes an enlarged image of the icon indicating contents of the corresponding process.

Preferably, the step of displaying the icon includes the step of displaying the icon in a prescribed less visibly recognizable manner, in response to the receiving unit receiving the input operation.

More preferably, the control method further includes the steps of adding a prescribed process to the selected process; and reflecting contents of the added process to the image representing the contents of the selected process.

Further preferably, the plurality of processes include at least: a one-sided/two-sided copy process for forming a two-sided copy from a one-sided document; and a two-sided/one-sided copy process for forming a one-sided copy from a two-sided document.

Preferably, at the step of displaying the image representing contents of the selected process in a prescribed state, images representing a state of images printed on two sides of a sheet of recording paper are displayed as images representing contents of the selected process, in a prescribed state, on the second area, in response to reception of an input operation to the virtual key corresponding to the one-sided/two-sided copy process.

More preferably, at the step of displaying the image representing contents of the selected process in a prescribed state, images representing a state of two images of one two-sided document respectively printed on one side of two sheets of recording paper are displayed as images representing contents of the selected process, in a prescribed state, on the second area, in response to reception of an input operation to the virtual key corresponding to the two-sided/one-sided copy process.

According to the present invention, if any of a plurality of processes is selected, an image indicating the contents of selected process is displayed in a prescribed state on the second area different from the first area on which the plurality of virtual keys are displayed. Therefore, it is possible for the user to easily understand the contents of selected process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
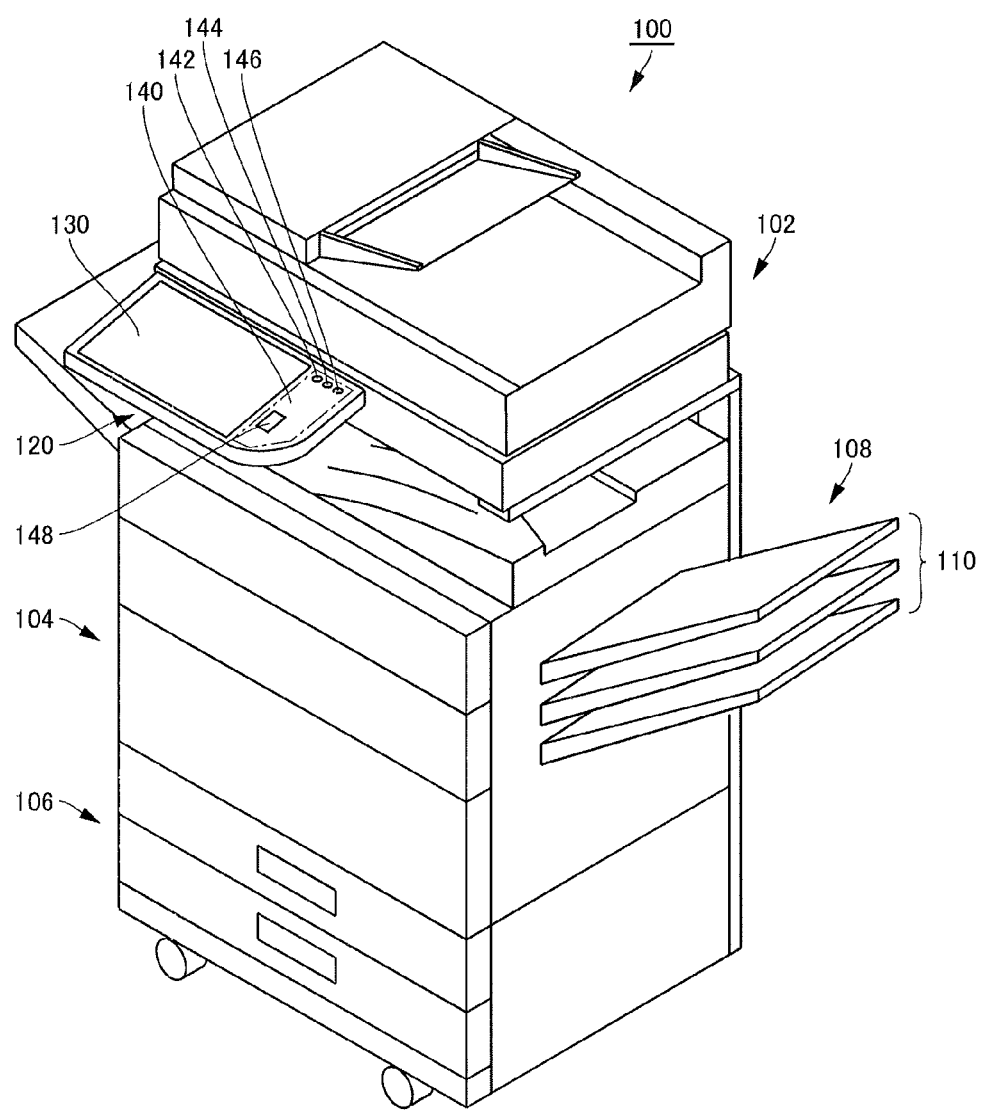
FIG. 1 shows an outer appearance of an image forming apparatus in accordance with an embodiment of the present invention.

In the following description, the same components are denoted by the same reference characters. Their names and functions are also the same. Therefore, detailed description thereof will not be repeated.

[Image Forming Apparatus 100]

Figure 2:
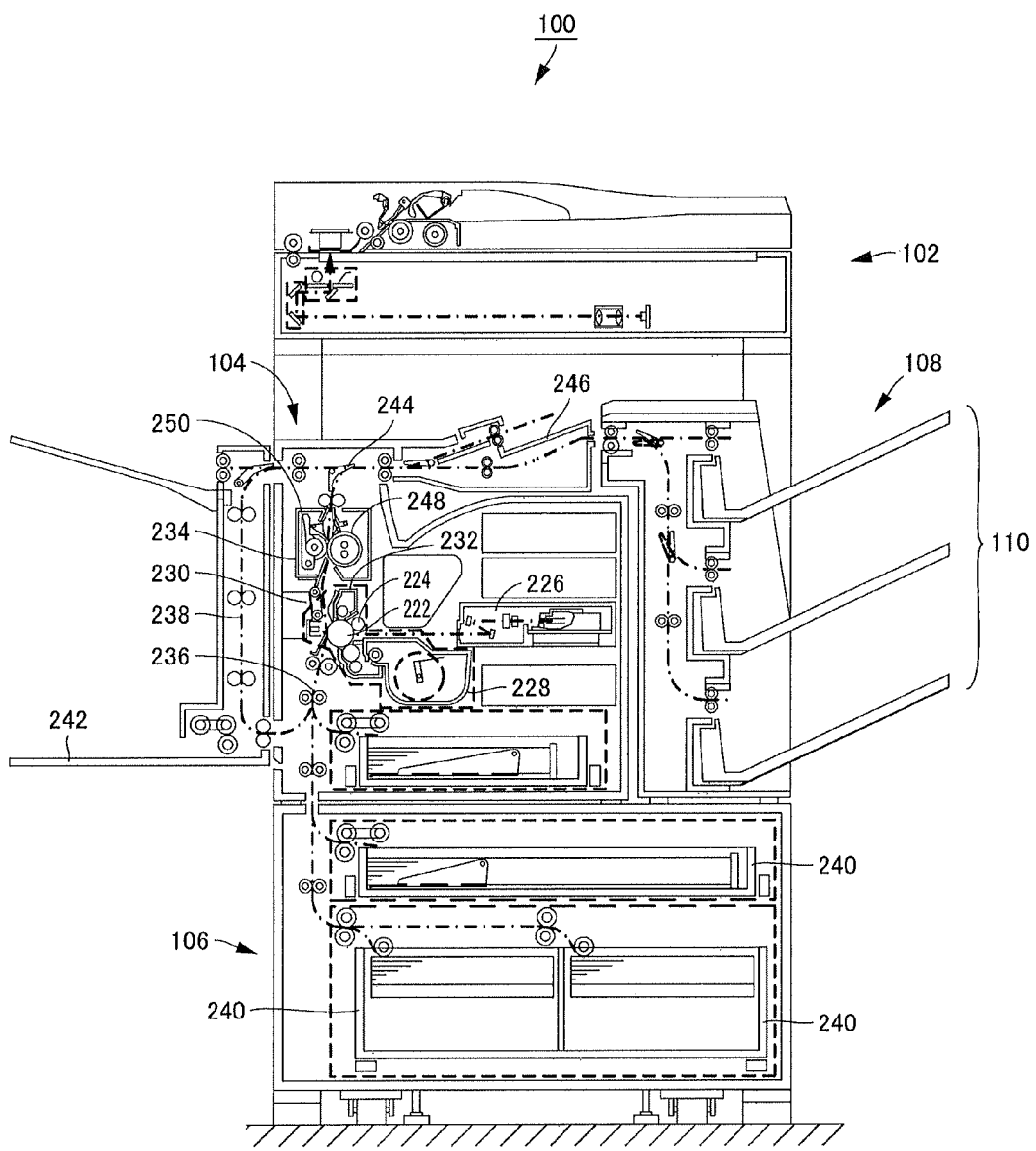
FIG. 2 schematically shows an inner configuration of the image forming apparatus shown in FIG. 1.
Figure 3:
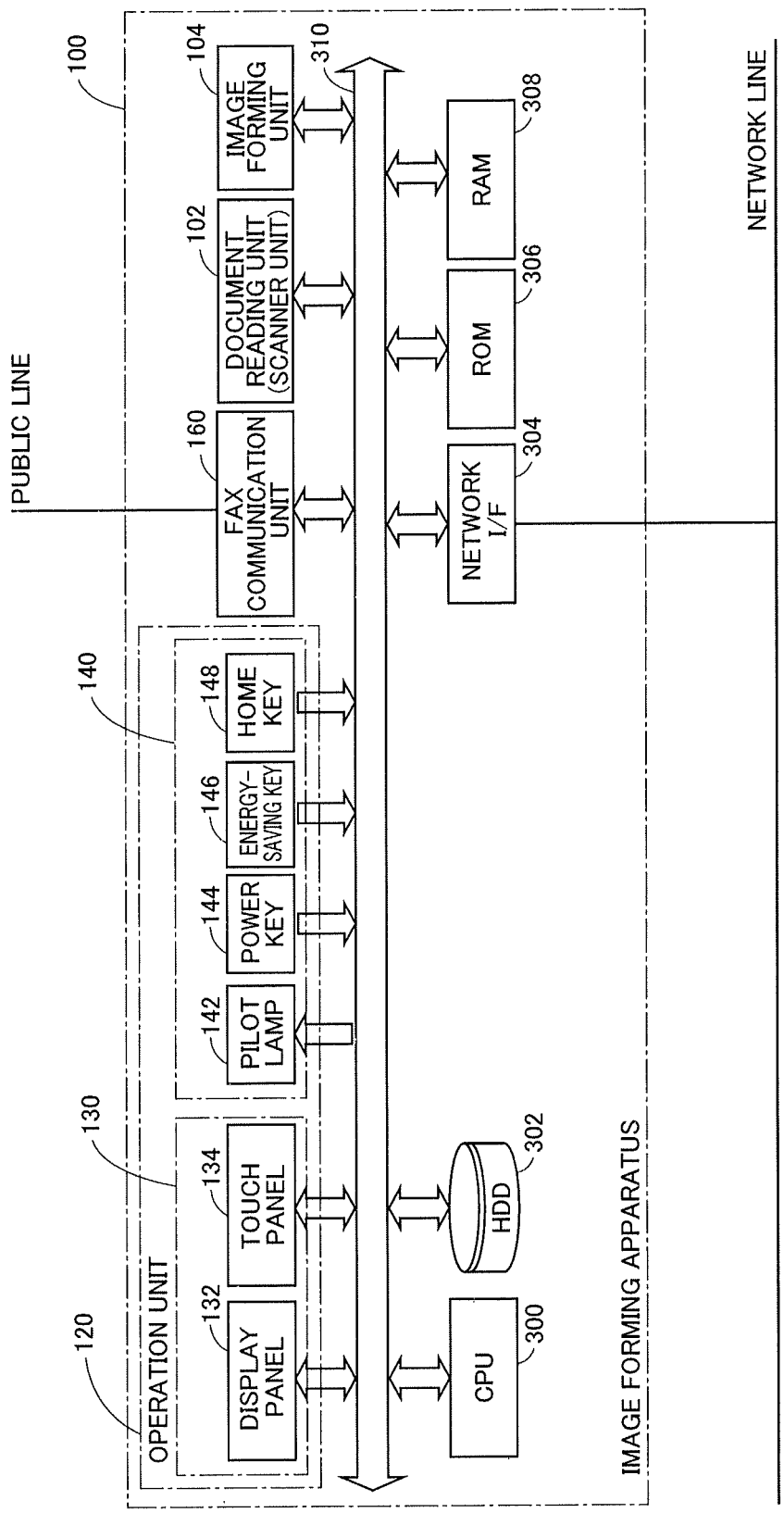
FIG. 3 is a block diagram showing an electrical configuration of the image forming apparatus shown in FIG. 1.

Referring to FIGS. 1 to 3, an image forming apparatus 100 in accordance with an embodiment of the present invention is a Multifunction Printer (MFP) having scanner function, copy function, facsimile (hereinafter denoted as FAX) function and the like. When the user selects any of the operational modes including the scanner mode, copy mode and FAX mode, image forming apparatus 100 executes processes corresponding to the selected operational mode.

<Hardware Configuration>

[Operation Unit 120 of Image Forming Apparatus 100]

Referring to FIGS. 1 and 3, image forming apparatus 100 includes an operation unit 120. Operation unit 120 is formed of a plate-shaped panel provided in an inclined manner to be easily viewable by the user on an upper front side of image forming apparatus 100. Operation unit 120 includes a touch-panel display 130 and a display operation unit 140. Touch-panel display 130 is arranged from the center to the left side on the surface of operation unit 120. Display operation unit 140 is arranged on the right side on the surface of operation unit 120. Touch-panel display 130 and display operation unit 140 are held in one housing and operation unit 120 is formed as one unit as a whole. Operation unit 120 communicates with a CPU (Central Processing Unit) 300, which will be described later, through an input/output interface (not shown).

Touch-panel display 130 is a touch-panel-integrated liquid crystal display device, including a display panel 132 and a touch-panel 134 which are formed in a superposed manner. On display panel 132, by way of example, a home screen image and a basic screen image are displayed. The home screen image allows selection of a desired operational mode from a plurality of operational modes executable by image forming apparatus 100. The basic screen image allows setting changes of various functions in the basic operational modes. The basic operational modes refer to the operational modes for executing image processing such as printing and transmission of image data. In the present embodiment, the basic operational modes mean the copy mode, the FAX mode and the scanner mode. The operation of touch-panel display 130 is controlled by CPU 300. By way of example, on the screen image displayed on display panel 132, software keys are displayed. When the user presses any of the software keys, touch-panel 134 detects the pressed position. CPU 300 compares the display position of the software key and the pressed position of the touch-panel 134 on a program, and based on the result of comparison, selects an operational mode, changes settings of various functions and issues an operation instruction. The size and shape of touch-panel display 130 are not specifically limited. By way of example, one having a rectangular shape of 1024 pixels×600 pixels of landscape orientation may be used.

Display operation unit 140 includes a pilot lamp 142 and various hardware keys such as a power key 144, an energy saving key 146 and a home key 148. Pilot lamp 142 includes, for example, an LED (Light Emitting Diode), and it is on when the power of image forming apparatus 100 is on. Power key 144 is for turning on/off the power of image forming apparatus 100.

Energy saving key 146 is for issuing an instruction to make a transition from a normal mode to an energy saving mode, or from the energy saving mode to the normal mode. Transition to the energy saving mode occurs not only when energy saving key 146 is pressed but also when a prescribed time passes without any user operation. The normal mode refers to a state in which the power is on and all operational modes are executable. The energy saving mode refers to a state in which the power is on and only some limited operational modes are executable.

Home key 148 is to issue an instruction to make a transition to the home screen image (not shown). When the user presses home key 148, the home screen image (not shown) including software keys for selecting the above-described basic operational modes is displayed on display panel 132.

When the user presses any of the software keys for selecting the basic operational modes displayed on the home screen image or the like as mentioned above, the basic screen image of the selected basic operational mode is displayed on display panel 132.

[Basic Screen Images of Basic Operational Modes]

Figure 4:
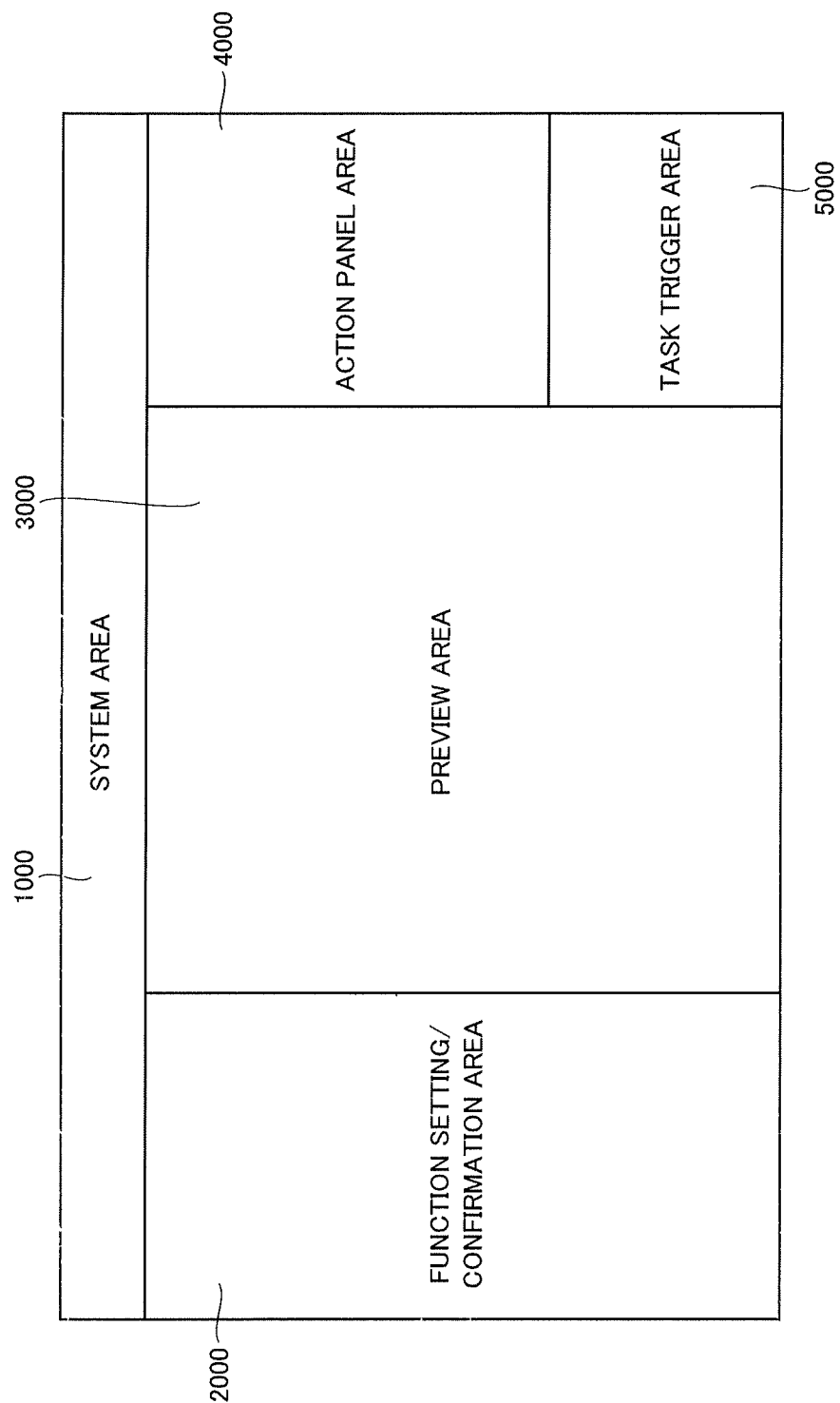
FIG. 4 shows a basic layout configuration of a basic screen image for basic operational modes.

In the following, basic layout configurations of the basic screen images of basic operational modes will be described. Referring to FIG. 4, the basic screen image of each operational mode includes five areas, that is, a system area 1000, a function setting/confirmation area (hereinafter referred to as "function selecting area") 2000, a preview area 3000, an action panel area 4000 and a task trigger area 5000. These five areas are arranged in the following manner, in accordance with a basic layout. Specifically, system area 1000 is arranged at the top of basic screen image. Preview area 3000 is arranged at the center of basic screen image. Function selecting area 2000 is arranged on the left side of preview area 3000 in the basic screen image. Action panel area 4000 is arranged on the upper right side of preview area 3000 in the basic screen image. Task trigger area 5000 is arranged on the lower right side of preview area 3000 in the basic screen image. The five areas forming the basic screen image of each operational mode and the basic layout are common in all operational modes. In the following, as an example of the basic screen image of basic operational mode, the basic screen image for the copy mode will be described.

[Copy Mode Basic Screen Image 6000]

Figure 5:
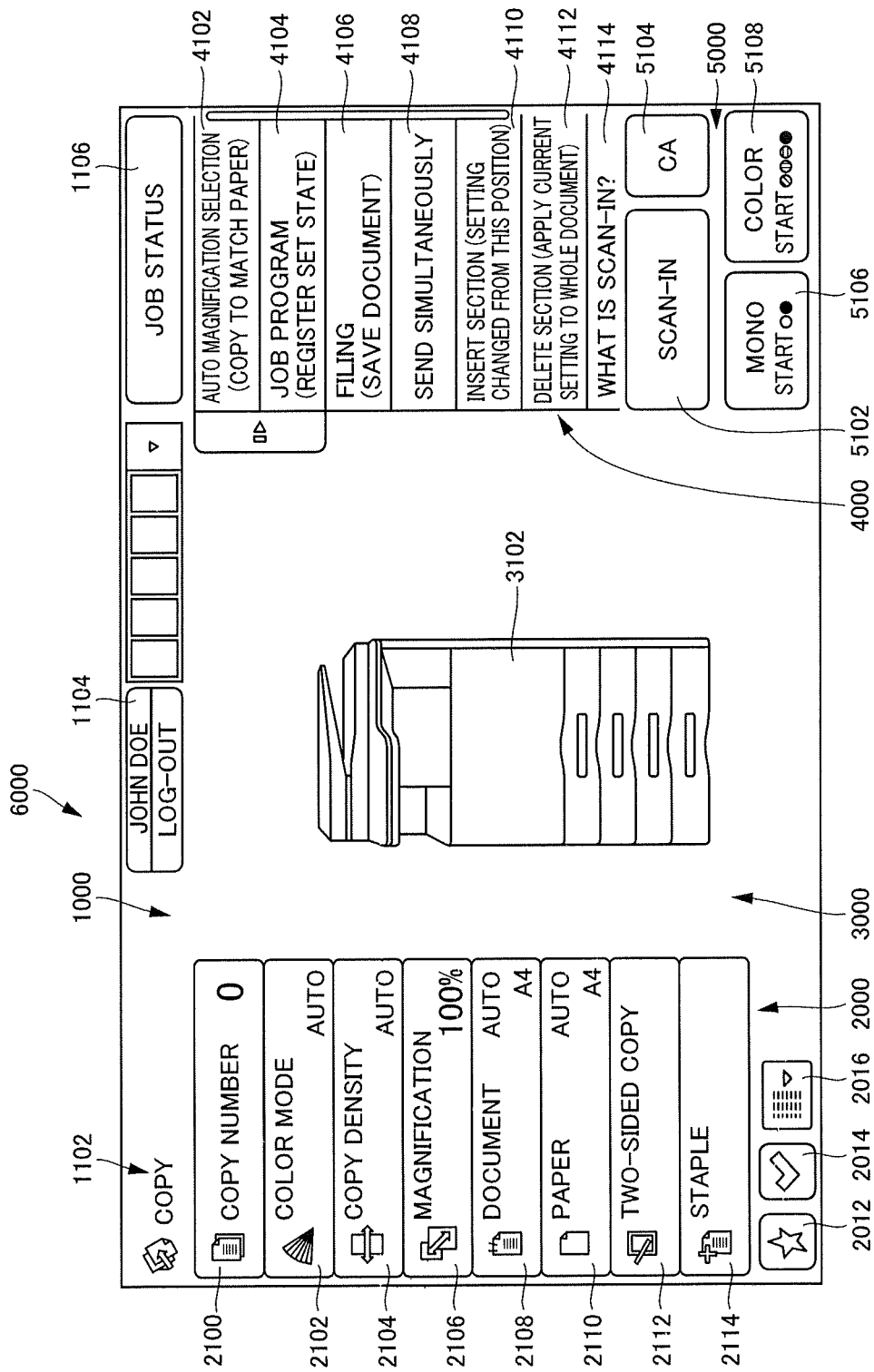
FIG. 5 shows an example of a copy mode basic screen image.

Referring to FIG. 5, on system area 1000 of copy mode basic screen image 6000, a character string 1102 of "copy", a log out key 1104 and the like are displayed. Character string 1102 indicates that it is the copy mode. Log out key 1104 is for executing log-out. On log out key 1104, a logged-in user name is displayed. System area 1000 further includes an area 1106 indicating the current job status. In this area 1106, an icon indicating that the copy process is being executed at present, and an icon indicating that the process is suspended (both not shown) are displayed.

On function selecting area 2000 of copy mode basic screen image 6000, various setting keys for changing settings of various functions for executing the copy mode are displayed. In the present embodiment, as various setting keys, keys 2100 to 2114 are displayed. Key 2100 is for changing the number of copies. Key 2102 is for changing color mode. Key 2104 is for changing copy density. Key 2106 is for changing copy magnification. Key 2108 is for changing document size. Key 2110 is for changing the size of recording paper to be used. Key 2112 is for setting the two-sided copy function. Key 2114 is for setting the stapling function. On keys 2102 to 2114, simple pictures and character sequences representing the function corresponding to each key are displayed. By way of example, on key 2102, a picture representing the function of changing the number of copies, a character sequence of "copy number" and the numerical value representing the set number of copies are displayed. If the user touches any of keys 2102 to 2114, a setting screen image corresponding to the pressed key (for example, copy number setting screen image, density setting screen image, magnification setting screen image, or document setting image (all not shown)) is displayed. In the present embodiment, on function selecting area 2000, a binding direction setting key (not shown) is also displayed, for setting the direction of binding. The binding direction means the direction of two-page spread of the output two-sided print (vertical or horizontal). When the user presses the binding direction setting key, a binding direction setting screen image for setting the binding direction appears on display panel 132. If the setting of binding direction is not changed by the user, horizontal binding is set as default setting.

Below the setting keys 2100 to 2114 described above in function selecting area 2000, change keys 2012 to 2016 are displayed, for changing the display style of setting keys 2100 to 2114. Change key 2012 is for displaying setting keys related to functions registered in advance as "favorites." Change key 2014 is for displaying only the setting keys related to a function of which setting has been changed. Change key 2016 is for displaying setting keys related to all functions of which setting can be changed in the designated operational mode. In the present embodiment, it is assumed that change key 2016 is selected and the setting keys related to all functions of which setting can be changed in the copy mode are displayed in the function selecting area 2000.

If not all setting keys to be displayed can be displayed in function selecting area 2000, various setting keys are displayed in upward/downward scrollable manner. Here, the display positions of change keys 2012 to 2016 are fixed. The user may switch the display portion of various setting keys upward/downward by, for example, a flick operation (an operation of lightly sweeping the display portion with a finger in a prescribed direction).

On preview area 3000 of copy mode basic screen image 6000, a mimic image 3102 representing the current status of overall image forming apparatus 100 is displayed. By a touch operation (an operation of pressing a display portion with a finger) on mimic image 3102, the user can have the paper setting screen image displayed on display panel 132. At the time of scan-in process, a preview image based on the scan data read by document reading unit 102 is displayed on preview area 3000.

On action panel area 4000 of copy mode basic screen image 6000, various execution keys for executing recommended functions in the copy mode are displayed. The recommended functions refer to functions selected in the past in combination with the function selected by the user. In the present embodiment, as various execution keys, keys 4102 to 4114 are displayed. Key 4102 is for automatically selecting copy magnification in accordance with the recording paper used. Key 4104 is for executing registration of current setting condition (job program). Key 4106 is for executing image data filing. Key 4108 is for executing transmission of image data simultaneously with the copy process. Key 4110 is for executing section insertion. Key 4112 is for executing section deletion. Key 4114 is for displaying a screen image showing contents of the scan-in process.

On task trigger area 5000 of copy mode basic screen image 6000, a scan-in key 5102, a clear-all key 5104, a monochrome start key 5106 and a color start key 5108 are displayed. Scan-in key 5102 is for starting execution of a scan-in process. In the scan-in process, a document is scanned and a preview image based on the obtained scan data is displayed on preview area 3000. Clear-all key 5104 cancels all functions and parameters of which settings have been changed, and returns the settings to the default state. Monochrome start key 5106 is for starting execution of a monochrome copy process in which a document is scanned and a monochrome copy is taken based on the obtained image data (or on scan data obtained by the scan-in process). Color start key 5108 is for starting a color copy process in which a document is scanned and a color copy is taken based on the obtained image data (or on scan data obtained by the scan-in process). As described above, in the present specification, the image data scanned by the scan-in process is referred to as "scan data" and distinguished from other image data.

When the user presses key 2112 for setting the two-sided copy function displayed on function selecting area 2000 of copy mode basic screen image 6000, the two-sided copy setting screen image is displayed on the front side of copy mode basic screen image 6000. In the following, an example of the two-sided copy setting screen image will be described.

[Two-sided Copy Setting Screen Image 7000]

Figure 6:
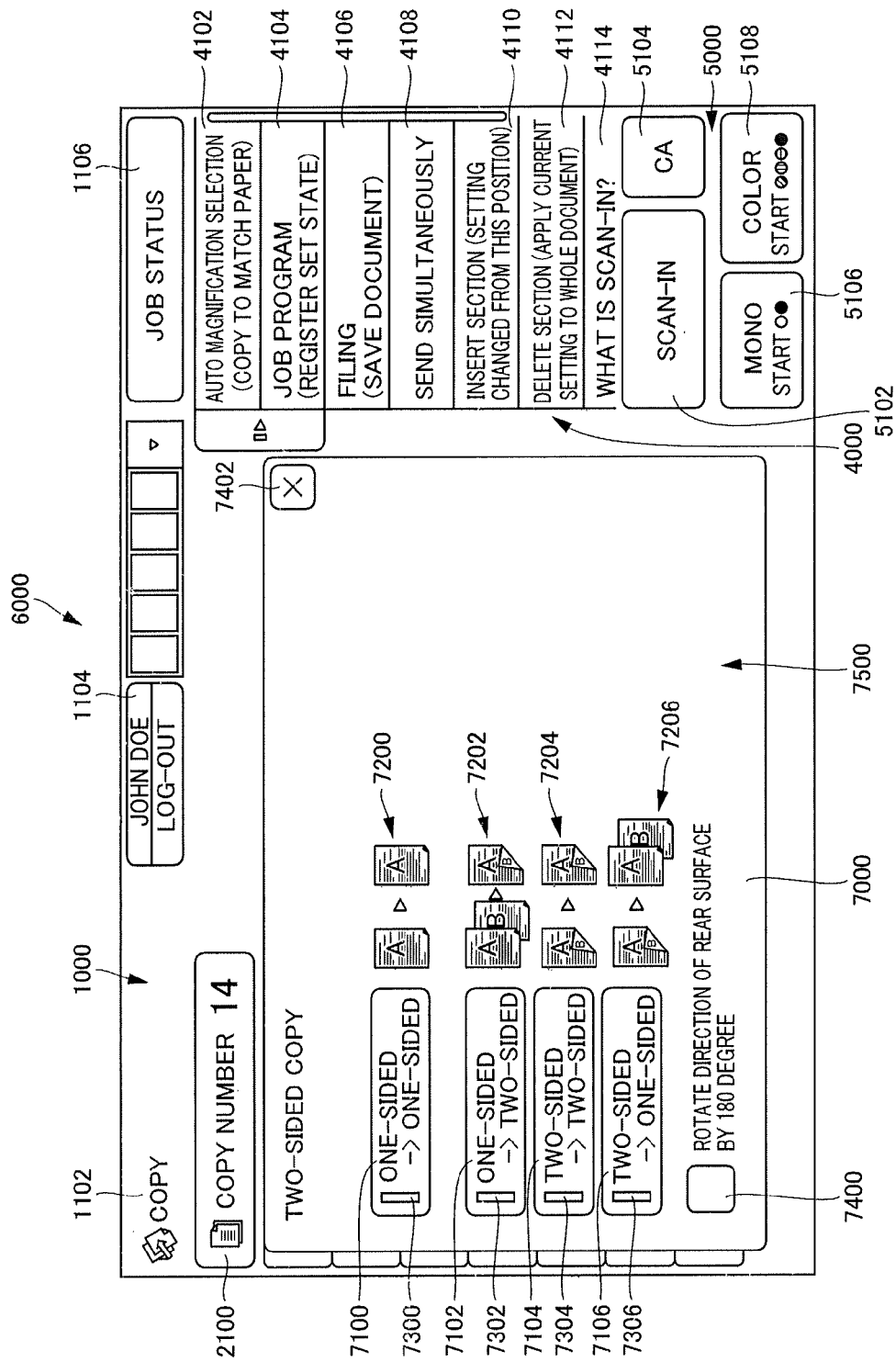
FIG. 6 shows an example of a two-sided copy setting screen image.

Referring to FIG. 6, on two-sided copy setting screen image 7000, keys 7100 to 7106 are displayed. One-sided/one-sided key 7100 is for setting the one-sided/one-sided copy. One-sided/two-sided key 7102 is for setting the one-sided/two-sided copy. Two-sided/two-sided key 7104 is for setting the two-sided/two-sided copy. Two-sided/one-sided key 7106 is for setting the two-sided/one-sided copy. In the following, these keys may generally be referred to as "two-sided copy setting keys." On two-sided copy setting keys 7100 to 7106, character strings representing the set contents corresponding to respective keys, and virtual pilot lamps 7300 to 7306 are displayed, respectively. Virtual pilot lamps 7300 to 7306 are displayed in yellow if the corresponding two-sided copy setting keys 7100 to 7106 are in the selected state (hereinafter referred to as "on"). Virtual pilot lamps 7300 to 7306 are displayed in black if the corresponding two-sided copy setting keys 7100 to 7106 are not in the selected state (hereinafter referred to as "off"). Simple pictures representing the set contents corresponding to respective keys are displayed as icons 7200 to 7206, in the vicinity of two-sided copy setting keys 7100 to 7106. In the following, the area in which two-sided copy setting keys 7100 to 7106 and icons 7200 to 7206 are displayed will be referred to as "still image display area."

On two-sided copy setting screen image 7000, a check box 7400 and a close button 7402 are further displayed. Check box 7400 is for setting "180° rotated copy", in which an image on the rear surface is printed with its direction rotated by 180°. Close button 7402 is for closing two-sided copy setting screen image 7000. When the user touches check box 7400, a check mark is displayed in check box 7400. On two-sided copy setting screen image 7000, a movie display area 7500 is further provided. On movie display area 7500, animation images are displayed as a movie, for demonstrating in detail contents of some setting (one-sided/two-sided copy, two-sided/one-sided copy, or the like). Movie display area 7500 is provided near the still image display area (in the present embodiment, at a neighboring position). Specifically, the animation is displayed close to the two-sided copy setting keys 7100 to 7106 and the icons 7200 to 7206, to be easily recognized by the user.

It is assumed that, if the setting of two-sided copy function is not changed by the user, one-sided/one-sided copy is set as default setting.

[Overall Configuration of Image Forming Apparatus 100]

Referring to FIGS. 1 to 3, image forming apparatus 100 includes, in addition to operation unit 120 described above, a document reading unit 102, an image forming unit 104, a paper feed unit 106, and a paper discharge unit 108. In the following, operations in the copy mode and the FAX mode will be described, to illustrate the overall hardware configuration of image forming apparatus 100.

—Copy Mode—

In the present embodiment, in the copy mode, document reading unit 102 and image forming unit 104 mainly operate to execute any of the scan-in process, mono-copy process and color copy process.

(Scan-In Process)

When the copy mode is selected by a user operation on the home screen image and scan-in key 5102 is touched, a document placed manually or by an ADF (Auto Document Feeder) on a platen is read as scan data by document reading unit 102. The read scan data is input to CPU 300. CPU 300 performs various image processing operations on the input scan data, and displays a preview image based on the scan data, on preview area 3000 of copy mode basic screen image 6000. At this time, the scan data is temporarily stored in a storage device (for example, in an RAM (Random Access Memory) 308 shown in FIG. 3).

(Normal Monochrome Copy Process and Color Copy Process)

When the copy mode is selected by a user operation on the home screen image and a monochrome start key 5106 or a color start key 5108 is touched while the scan-in process described above is not being done, a document placed manually or by an ADF on a platen is read as image data by document reading unit 102. The read image data is input to CPU 300 implemented, for example, by a microcomputer, shown in FIG. 3, and subjected to various image processing operations. Then, the image data is output to image forming unit 104.

Image forming unit 104 is for printing an image of the document based on the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer (not shown).

In image forming unit 104, a main feeding path 236 and a reverse feeding path 238 are provided. Paper feed unit 106 draws out sheets of recording paper stacked on a paper feed cassette 240 or on a manual feed tray 242 one by one, and feeds the sheet of paper to main feeding path 236 of image forming unit 104. The sheet of recording paper fed from paper feed unit 106 is fed along main feeding path 236.

While the sheet of recording paper is fed along main feeding path 236, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222. When the monochrome copy process is executed, developer 228 supplies monochrome toner. When the color copy process is executed, developer 228 supplies color toner including yellow (Y), magenta (M), cyan (C) and black (K).

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater provided in heating roller 248 is heated by electric power supplied to fixing device 234 and controlled such that temperature of heating roller 248 attains to an appropriate temperature for fixing.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned from the above-described state to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108 by separation pawl 244 returned to the original state.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. The mechanism for punching and stapling is not shown. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

(Monochrome Copy Process and Color Copy Process after Scan-In Process)

When the copy mode is selected on the home screen image, the scan-in process described above is done and thereafter, monochrome start key 5106 or a color start key 5108 may be touched. In such a case, scanning of the document image and the image processing on the image data described above do not take place, and image forming unit 104 performs the image forming process in the similar manner as described above on the scan data that has been read in the scan-in process and stored temporarily in the storage device.

—FAX Mode—

In the present embodiment, in the FAX mode, FAX communication process is executed by the operation of FAX communication unit 160. Therefore, the scan-in process and the FAX transmission process are executed by the operations of document reading unit 102 and FAX communication unit 160 shown in FIG. 3. Further, the FAX reception process is executed by the operations of FAX communication unit 160 and image forming unit 104.

(Scan-In Process)

When the FAX mode is selected on the home screen image and the scan-in key (not shown) displayed on the basic screen image of FAX mode (not shown) is touched, a document placed manually or by an ADF on a platen is read as scan data by document reading unit 102. The read scan data is input to CPU 300. CPU 300 performs various image processing operations on the input scan data, and displays a preview image based on the scan data, on preview area 3000 of FAX mode initial screen image (not shown). Here, the scan data is temporarily stored in a storage device (for example, in RAM 308 shown in FIG. 3).

(Normal Fax Transmission Process)

When the FAX mode is selected on the home screen image and a start key (not shown) displayed on the FAX mode basic screen image (not shown) is touched while the scan-in process is not being done, a document placed manually or by an ADF on a platen is read as image data by document reading unit 102. The read image data is input to CPU 300, and subjected to various image processing operations. Then, the image data is output to FAX communication unit 160.

On the other hand, when the FAX mode is selected on the home screen image, the scan-in process described above is done and thereafter, the start key (not shown) may be touched. In such a case, scanning of the document image and the image processing on the image data described above do not take place, and the scan data that has been read in the scan-in process, temporarily stored in the storage device is output to FAX communication unit 160.

FAX communication unit 160 of image forming apparatus 100 on the transmitting side connects a transmitting side line to a designated transmission destination. FAX communication unit 160 converts the input image data or scan data to communication data in compliance with facsimile transmission standard, and transmits the converted data to a facsimile machine (such as an image forming apparatus 100 having the facsimile function) on the receiving side.

(FAX Communication Process)

When the line is connected, a FAX communication unit 160 of image forming apparatus 100 on the receiving side detects a communication request signal from FAX communication unit 160 of image forming apparatus 100 on the transmitting side, and transmits an acknowledgement signal. Thereafter, by way of example, FAX communication units 160 on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to FAX communication unit 160 of image forming apparatus 100 on the receiving side. When transmission ends, the line is disconnected.

(Fax Reception Process)

FAX communication unit 160 of image forming apparatus 100 on the receiving side converts the received data to image data and passes the data to an image forming unit 104. The received data may be converted to image data at the image forming unit 104. The image forming unit 104 prints an image of a document based on the image data converted from the received data on a sheet of recording paper, in a manner similar to the operation in the copy mode described above.

<Electrical Configuration>

Referring to FIG. 3, image forming apparatus 100 includes: operation unit 120, an ROM (Read Only Memory) 306, an HDD (Hard Disk Drive) 302, and an RAM 308. ROM 306 stores a program or programs. HDD 302 includes a hard disk providing a non-volatile storage area capable of storing programs and data even when power supply is shut off. RAM 308 provides a storage area when a program is executed.

Image forming apparatus 100 further includes a bus 310 and CPU 300. Bus 310 is connected to document reading unit 102, image forming unit 104, FAX communication unit 160, operation unit 120, HDD 302, ROM 306, RAM 308, and network interface (hereinafter referred to as "network I/F") 304. CPU 300 is connected to bus 310 and controlling these units and components for realizing general functions of the image forming apparatus.

HDD 302 stores various data such as the image data scanned by document reading unit 102. HDD 302 further stores animation images for the one-sided/two-sided copy, animation images for the two-sided/one-sided copy, animation images for the one-sided/two-sided copy plus rotation by 180°, and animation images for two-sided/one-sided copy plus rotation by 180°. For each of these animations, HDD 302 stores two types of images, that is, for vertical binding and horizontal binding. Specifically, HDD 302 stores a total of eight different animations. Details of the animation images will be described later.

ROM 306 stores computer programs for realizing general operations of image forming apparatus 100 as well as a computer program for realizing the two-sided copy setting process, which will be described later. ROM 306 further stores basic screen image data for displaying basic screen images for various operational modes and setting screen image data for displaying various setting screen images.

RAM 308 provides a function of a working memory temporarily storing results of operations and processes by CPU 300, and a function of a frame memory for storing image data. CPU 300 executes control related to various functions of image forming apparatus 100 in accordance with computer programs stored in ROM 306. Specifically, control of various units including document reading unit 102, image forming unit 104, touch-panel display 130 and display operation unit 140 of operation unit 120, HDD 302, ROM 306 and RAM 308 is realized by CPU 300 executing a prescribed computer program.

As shown in FIG. 3, a public line is connected for transmitting/receiving image data, to FAX communication unit 160 of image forming apparatus 100. To network I/F 304, a network line is connected. To the network line, a computer is connected. The computer uses image forming apparatus 100 as a network-supported printer. The computer is identified by a URL designated through the Internet. When connected to the Internet through the network line, image forming apparatus 100 can obtain necessary information through the Internet.

<Software Configuration>

(Two-Sided Copy Setting Process)

A program for realizing the two-sided copy setting process is activated when key 2112 for setting the two-sided copy function, displayed on function selecting area 2000 of copy mode basic screen image 6000, is pressed.

Figure 7:
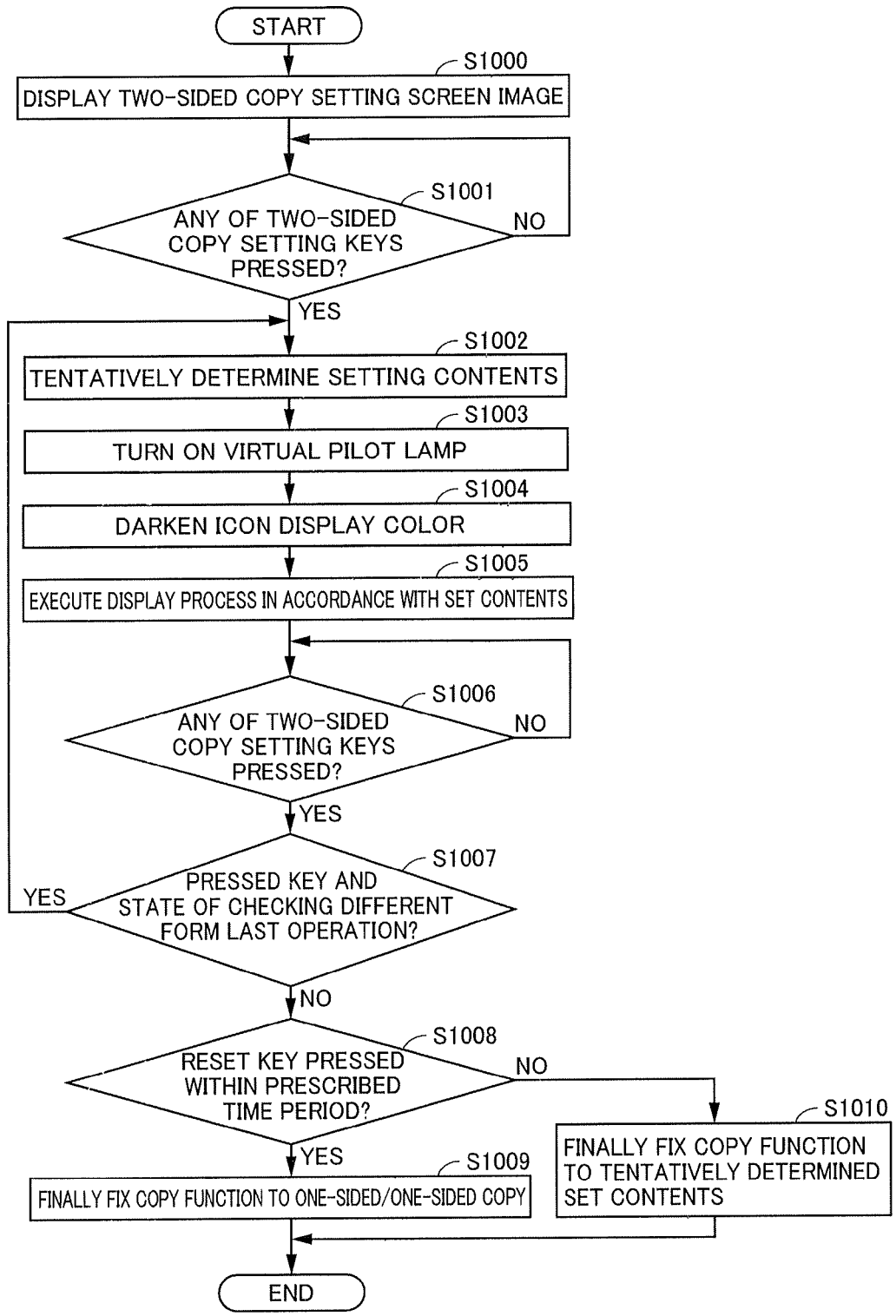
FIG. 7 is a flowchart representing a control structure of a computer program for realizing the two-sided copy setting process.

Referring to FIG. 7, the program includes steps S1000 and S1001. At step S1000, CPU 300 displays two-sided copy setting screen image 7000 (see FIG. 6) for setting the two-sided copy function, in front of copy mode basic screen image 6000. At step S1001, CPU 300 determines whether or not any of the two-sided copy setting keys displayed on two-sided copy setting screen image 7000 is pressed. CPU 300 repeats step S1001 until any of the two-sided copy setting keys is pressed.

The program further includes a step S1002. Step S1002 is executed if it is determined at step S1001 that any of the two-sided copy setting keys is pressed (YES). At step S1002, CPU 300 temporarily determines contents of setting related to the two-sided copy, based on the set binding direction, pressed key and whether or not check box 7400 is checked.

The program further includes steps S1003, S1004 and S1005. At step S1003, CPU 300 displays the virtual pilot lamp of the pressed two-sided copy setting key in yellow (on). At step S1004, CPU 300 darkens the color of an icon displayed close to the pressed two-sided copy setting key. At step S1005, CPU 300 executes the display process in accordance with the set contents temporarily determined at step S1002. At step S1004, the icon is displayed in a dark color such as black or gray, which is difficult to recognize visually. At step S1005, if the set contents correspond to one-sided/two-sided copy or two-sided/one-sided copy, corresponding animation images are read from HDD 302. The read animation images are displayed as a movie on movie display area 7500. On the other hand, if the set contents are one-sided/one-sided copy or two-sided/two-sided copy, nothing is displayed on movie display area 7500.

The program further includes steps S1006 and S1007. At step S1006, CPU 300 determines which of the two-sided copy setting keys displayed on two-sided copy setting screen image has been pressed. CPU 300 repeats step S1006 until any of the two-sided copy setting keys is pressed. Step S1007 is executed if it is determined at step S1006 that any of the two-sided copy setting keys is pressed (YES). At step S1007, CPU 300 determines whether or not the pressed two-sided copy setting key and the state of check box 7400 (checked or not) are different from those of the last operation. If it is determined at step S1007 that the pressed two-sided copy setting key and the state of check box 7400 are different from those of the last operation (YES), the control returns to step S1002.

The program further includes a step S1008. Step S1008 is executed if it is determined at step S1007 that the pressed two-sided copy setting key and the state of check box 7400 are the same as those of the last operation (NO). At step S1008, CPU 300 determines whether or not a reset key (in the present embodiment, clear-all key 5104 displayed on task trigger area 5000) is pressed within a prescribed time period.

The program further includes steps S1009 and S1010. Step S1009 is executed if it is determined at step S1008 that a reset key is pressed within the prescribed time period (YES). At step S1009, CPU 300 finally fixes the two-sided copy function to the default setting of one-sided/one-sided copy. Step S1010 is executed if it is determined at step S1008 that the reset key has not been pressed within the prescribed time period (NO). At step S1010, CPU 300 finally fixes the two-sided copy function to the set contents that have been tentatively determined at step S1002.

The program ends when the user presses close button 7402.
<Operation>
Referring to FIGS. 1 to 16, image forming apparatus 100 operates in the following manner. General operations of image forming apparatus 100 except for the following operation are the same as those of conventional image forming apparatuses. In the following operation, it is assumed that image forming apparatus 100 is powered on.

The user presses home key 148 of display operation unit 140. When home key 148 is pressed, the home screen image (not shown) is displayed on display panel 132. The user presses a software key for selecting the copy mode, displayed on the home screen image. When the software key for selecting the copy mode is pressed, copy mode basic screen image 6000 (see FIG. 5) is displayed on display panel 132.

The user confirms the copy mode basic screen image 6000. If necessary, the user makes an input operation or operations on various setting keys, to change settings of various functions related to the copy mode. In the present embodiment, the user presses key 2100 for changing the number of copies, displayed on function selecting area 2000. When key 2100 is pressed, a copy number setting screen image (not shown) including a group of virtual ten keys for changing the number of copies is displayed in front of copy mode basic screen image 6000. The user sets a desired number of copies (in the present embodiment, 14) by an input operation on the copy number setting screen image. Here, it is assumed that the user does not change the setting of binding direction, and the binding direction is kept to the default setting of horizontal binding.

The user further presses key 2112 for setting the two-sided copy function displayed on function selecting area 2000. When key 2112 is pressed, two-sided copy setting screen image 7000 (see FIG. 6) is displayed in front of copy mode basic screen image 6000 (step S1000).

The user presses one-sided/two-sided key 7102 for setting the one-sided/two-sided copy displayed on two-sided copy setting screen image 7000. At this time, it is assumed that check box 7400 is not checked. When one-sided/two-sided key 7102 is pressed (YES at step S1001), CPU 300 tentatively determines the contents of setting related to the two-sided copy, based on the set binding direction, pressed key and whether or not check box 7400 is checked (step S1002). Here, as the set contents, one-sided/two-sided copy for horizontal binding are tentatively determined.

When the set contents are tentatively determined, CPU 300 displays virtual pilot lamp 7302 of pressed one-sided/two-sided key 7102 in yellow (on) (step S1003). In addition, CPU 300 darkens (in the present invention, turns to gray) the color of display of icon 7202 displayed close to the pressed one-sided/two-sided key 7102 (step S1004).

Figure 8:
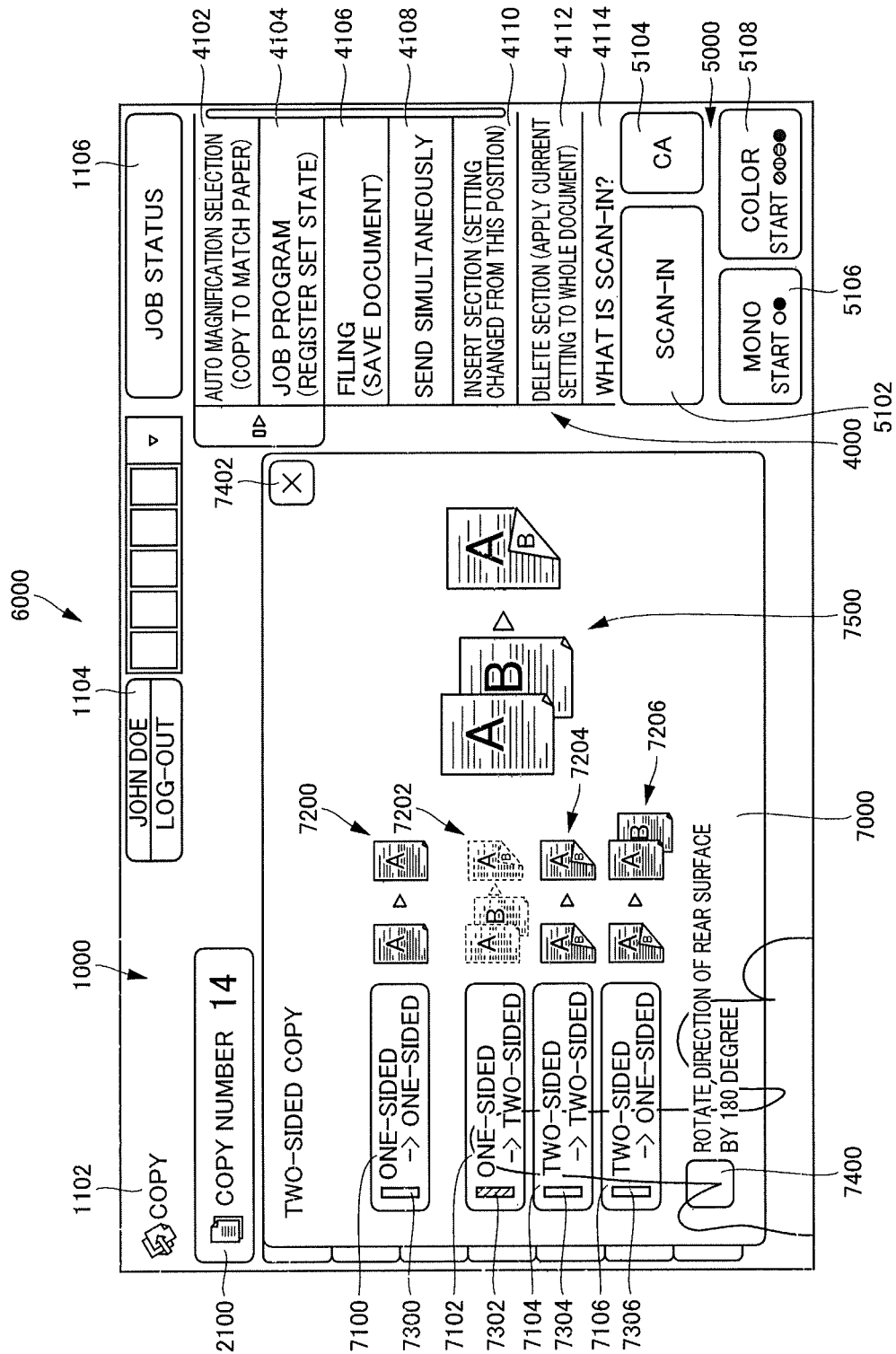
FIG. 8 shows an exemplary state of the two-sided copy setting screen image when a one-sided/two-sided key is pressed.
Figure 9:
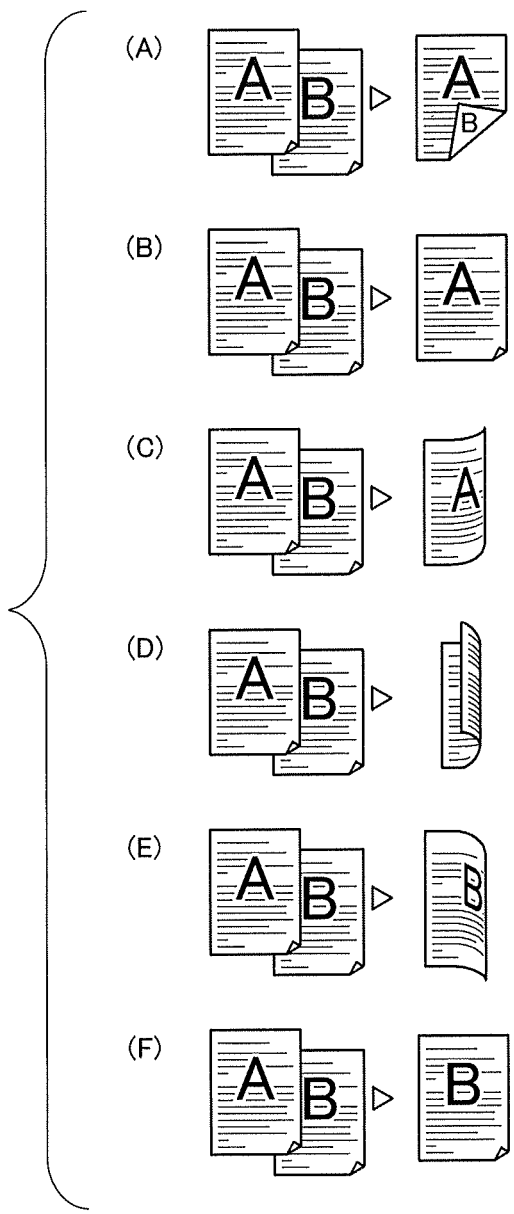
FIG. 9 shows a movie display of animation images representing one-sided/two-sided copy for horizontal binding.

CPU 300 further executes a display process in accordance with the tentatively determined set contents (step S1005). Here, the set contents are one-sided/two-sided copy for horizontal binding and, therefore, CPU 300 reads the animation images for the one-sided/two-sided copy for horizontal binding from HDD 302, and displays the first image of the animation on movie display area 7500 (see FIG. 8). Referring to FIG. 8, the first image of animation is an enlargement of icon 7202. CPU 300 further displays the movie of animation on movie display area 7500. Referring to FIG. 9, on movie display area 7500, animation images for the one-sided/two-sided copy for horizontal binding are displayed one after another, first from (A) to (F) of FIG. 9, and thereafter from (F) to (A) of FIG. 9. By the animation images, the state of images to be printed on two sides of the recording paper can be seen in detail. When the series of movie display ends, the animation images are erased from movie display area 7500.

After confirming the animation images for the one-sided/two-sided copy for horizontal binding, the user checks check box 7400 displayed on two-sided copy setting screen image 7000, and again presses one-sided/two-sided key 7102. When one-sided/two-sided key 7102 is pressed (YES at S1006), CPU 300 determines whether or not the pressed two-sided copy setting key and the state of check box 7400 (checked or not) are different from those of the last operation (step S1007). Here, the pressed two-sided copy setting key is the same as the key pressed last time. However, the state of check box 7400 is different from the last time. Therefore, CPU 300 makes a determination that the pressed two-sided copy setting key or state of check box 7400 is different from the last operation (YES at step S1007). Then, based on the set binding direction, pressed key and whether check box 7400 is checked or not, CPU 300 tentatively determines the set contents related to the two-sided copy (step S1002). Here, as the set contents, one-sided/two-sided copy for horizontal binding plus rotation by 180° are determined tentatively.

When the set contents are determined tentatively, CPU 300 displays the virtual pilot lamp 7302 of pressed one-sided/two-sided key 7102 in yellow (on) (step S1003). In addition, CPU 300 darkens (in the present invention, turns to gray) the color of display of icon 7202 displayed close to the pressed one-sided/two-sided key 7102 (step S1004).

Figure 10:
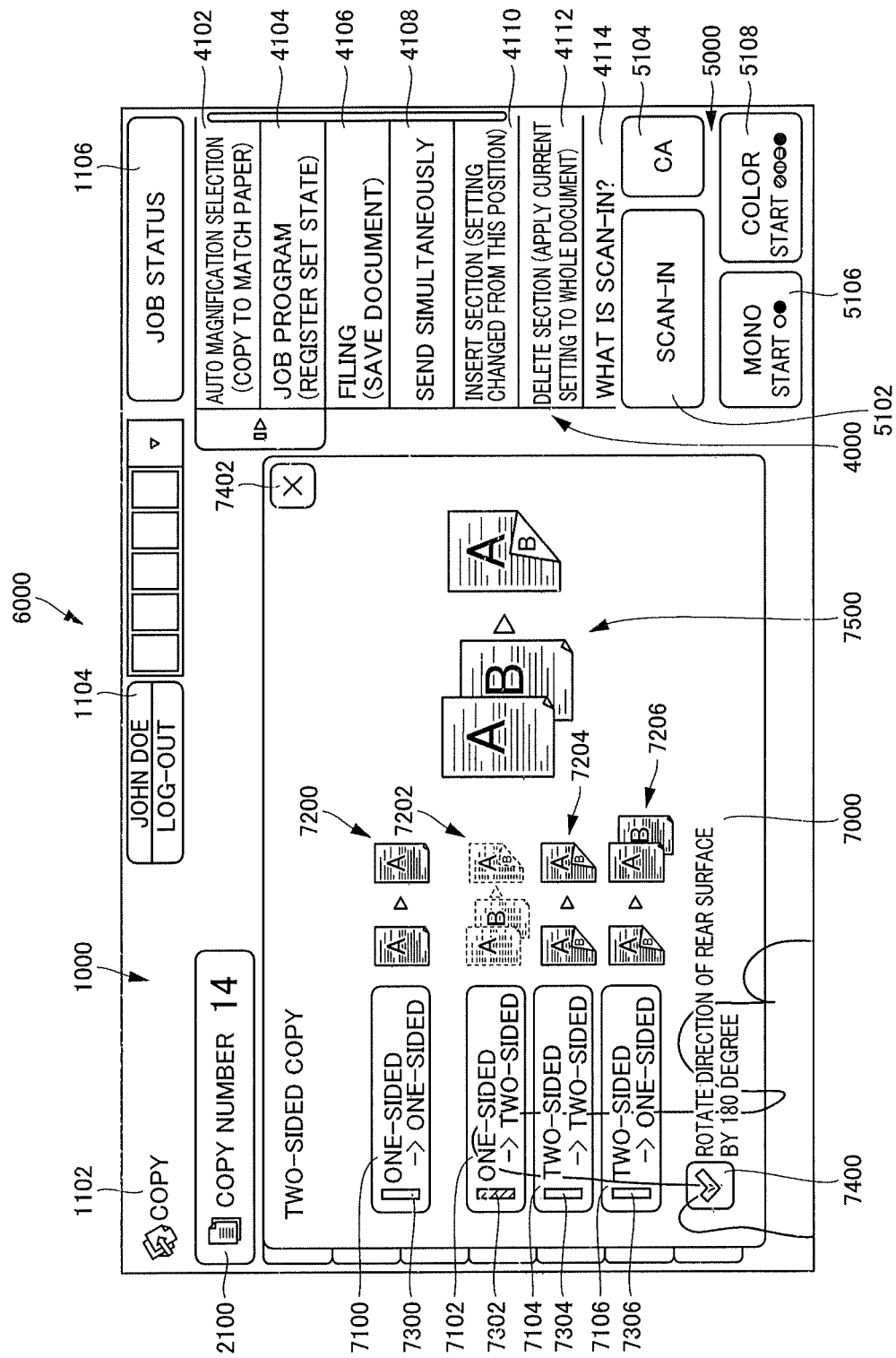
FIG. 10 shows an exemplary state of the two-sided copy setting screen image when a one-sided/two-sided key is pressed.
Figure 11:
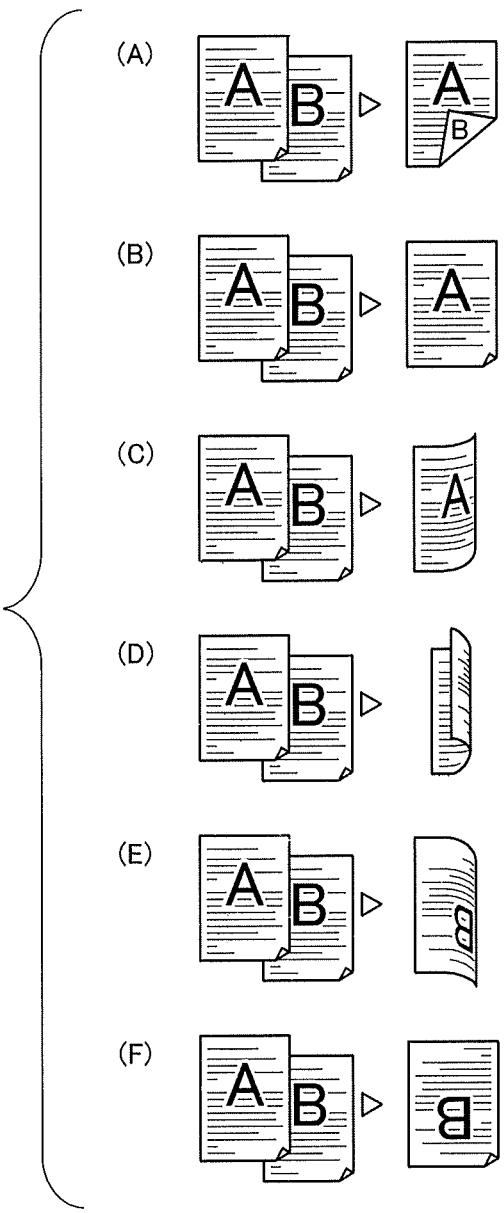
FIG. 11 shows a movie display of animation images representing one-sided/two-sided copy for horizontal binding plus rotation by 180°.

CPU 300 further executes a display process in accordance with the tentatively determined set contents (step S1005). Here, the set contents are one-sided/two-sided copy for horizontal binding plus rotation by 180° and, therefore, CPU 300 reads animation images for one-sided/two-sided copy for horizontal binding plus rotation by 180° from HDD 302, and displays the first image of the animation on movie display area 7500 (see FIG. 10). Referring to FIG. 10, the first image of animation is an enlargement of icon 7202. CPU 300 further displays the movie of animation on movie display area 7500. Referring to FIG. 11, on movie display area 7500, animation images for the one-sided/two-sided copy for horizontal binding plus rotation by 180° are displayed one after another, first from (A) to (F) of FIG. 11, and thereafter from (F) to (A) of FIG. 11. By the animation images, the state of images to be printed on two sides of the recording paper can be seen in detail. When the series of movie display ends, the animation images are erased from movie display area 7500.

After confirming the animation images for the one-sided/two-sided copy for horizontal binding plus rotation by 180°, the user presses two-sided/one-sided key 7106 for setting the two-sided/one-sided copy displayed on two-sided copy setting screen image 7000. Here, it is assumed that check box 7400 is not checked. When two-sided/one-sided key 7106 is pressed (YES at S1006), CPU 300 determines whether or not the pressed two-sided copy setting key and the state of check box 7400 (checked or not) are different from those of the last operation (step S1007). Here, the pressed two-sided copy setting key is different from the key pressed last time and the state of check box 7400 is different from the last time. Therefore, CPU 300 makes a determination that the pressed two-sided copy setting key and state of check box 7400 are different from those of the last operation (YES at step S1007). Then, based on the set binding direction, pressed key and whether check box 7400 is checked or not, CPU 300 tentatively determines the set contents related to the two-sided copy (step S1002). Here, as the set contents, two-sided/one-sided copy for horizontal binding are determined tentatively.

When the set contents are determined tentatively, CPU 300 displays the virtual pilot lamp 7306 of pressed two-sided/one-sided key 7106 in yellow (on) (step S1003). In addition, CPU 300 darkens (in the present invention, turns to gray) the color of display of icon 7206 displayed close to the pressed two-sided/one-sided key 7106 (step S1004).

Figure 12:
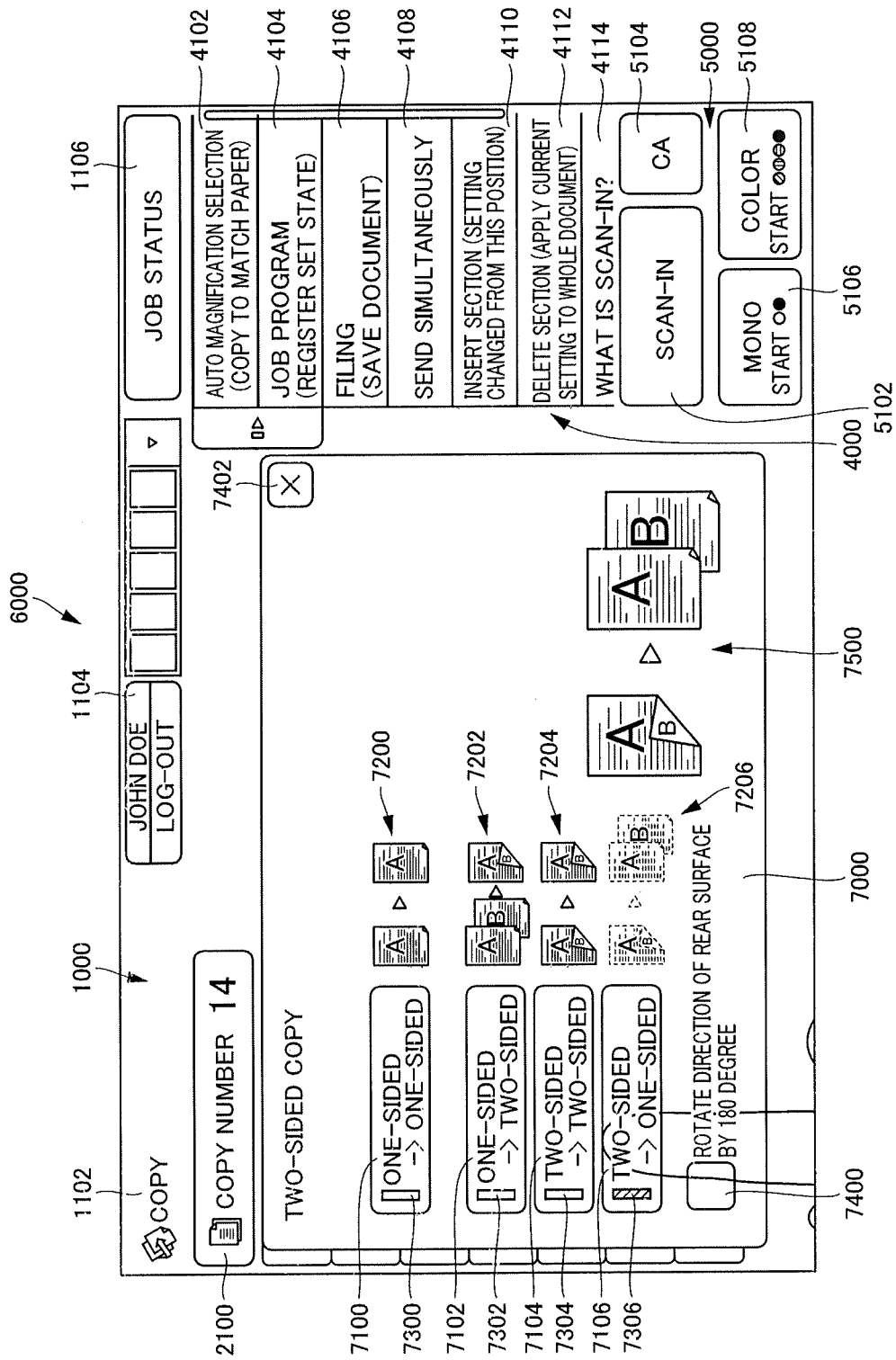
FIG. 12 shows an exemplary state of the two-sided copy setting screen image when a two-sided/one-sided key is pressed.
Figure 13:
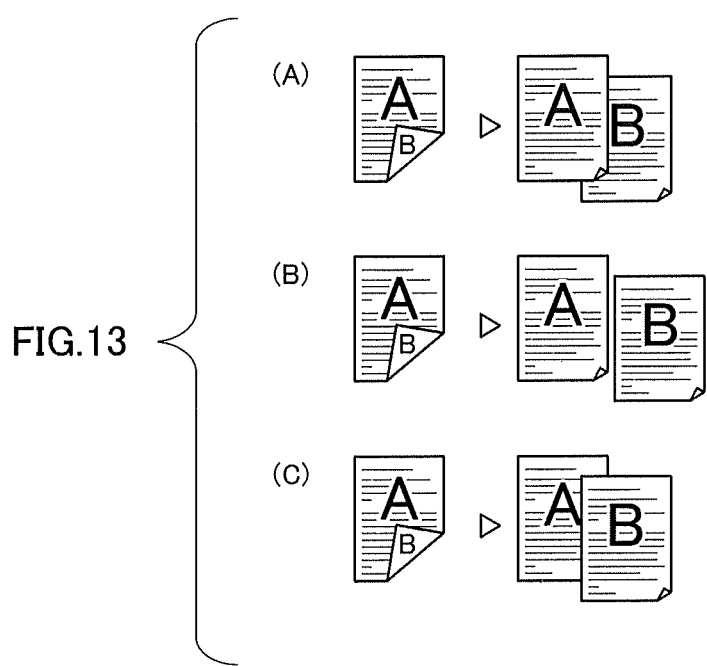
FIG. 13 shows a movie display of animation images representing two-sided/one-sided copy for horizontal binding.

CPU 300 further executes a display process in accordance with the tentatively determined set contents (step S1005). Here, the set contents are two-sided/one-sided copy for horizontal binding. Therefore, CPU 300 reads animation images for two-sided/one-sided copy for horizontal binding from HDD 302, and displays the first image of the animation on movie display area 7500 (see FIG. 12). Referring to FIG. 12, the first image of animation is an enlargement of icon 7206. CPU 300 further displays the movie of animation on movie display area 7500. Referring to FIG. 13, on movie display area 7500, animation images for the two-sided/one-sided copy for horizontal binding are displayed one after another, first from (A) to (C) of FIG. 13, and thereafter from (C) to (A) of FIG. 13. By the animation images, the state of two images on one two-sided document to be printed on one side of two sheets of recording paper can be seen in detail. When the series of movie display ends, the animation images are erased from movie display area 7500.

After confirming the animation images for the two-sided/one-sided copy for horizontal binding, the user checks check box 7400 displayed on two-sided copy setting screen image 7000, and again presses two-sided/one-sided key 7106. When two-sided/one-sided key 7106 is pressed (YES at S1006), CPU 300 determines whether or not the pressed two-sided copy setting key and the state of check box 7400 (checked or not) are different from those of the last operation (step S1007). Here, the pressed two-sided copy setting key is the same as the key pressed last time. However, the state of check box 7400 is different from the last time. Therefore, CPU 300 makes a determination that the pressed two-sided copy setting key or the state of check box 7400 is different from the last operation (YES at step S1007).

Then, based on the set binding direction, pressed key and whether check box 7400 is checked or not, CPU 300 tentatively determines the set contents related to the two-sided copy (step S1002). Here, as the set contents, two-sided/one-sided copy for horizontal binding plus rotation by 180° are determined tentatively.

When the set contents are tentatively determined, CPU 300 displays virtual pilot lamp 7306 of pressed two-sided/one-sided key 7106 in yellow (on) (step S1003). In addition, CPU 300 darkens (in the present invention, turns to gray) the color of display of icon 7206 displayed close to the pressed two-sided/one-sided key 7106 (step S1004).

Figure 14:
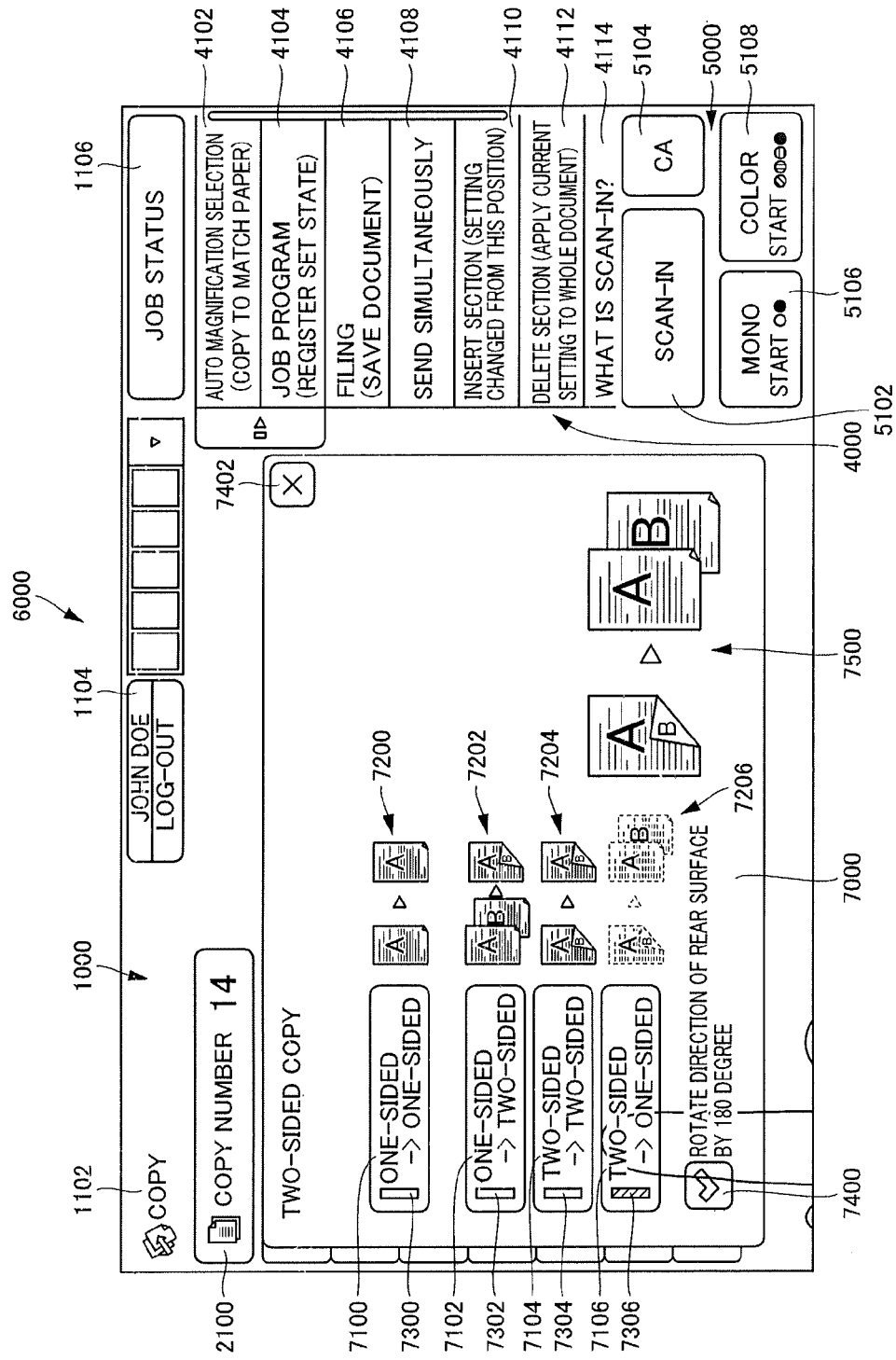
FIG. 14 shows an exemplary state of the two-sided copy setting screen image when a two-sided/one-sided key is pressed.
Figure 15:
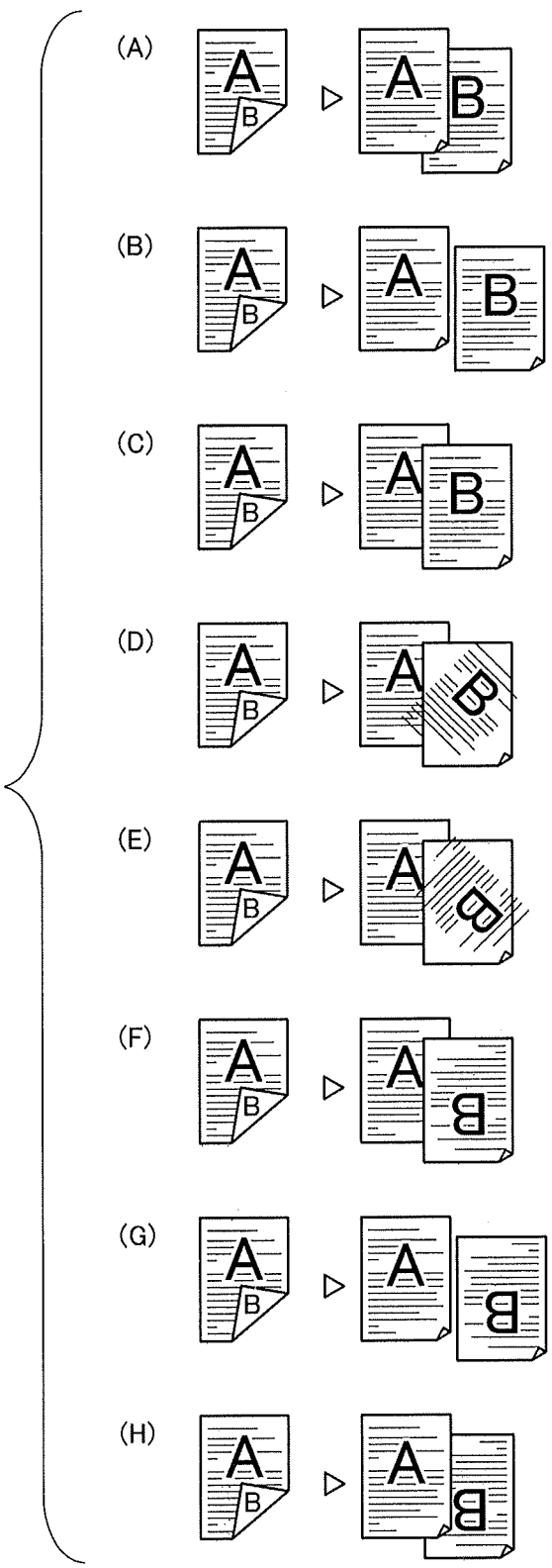
FIG. 15 shows a movie display of animation images representing two-sided/one-sided copy for horizontal binding plus rotation by 180°.

CPU 300 further executes a display process in accordance with the tentatively determined set contents (step S1005). Here, the set contents are two-sided/one-sided copy for horizontal binding plus rotation by 180° and, therefore, CPU 300 reads animation images for two-sided/one-sided copy for horizontal binding plus rotation by 180° from HDD 302, and displays the first image of the animation on movie display area 7500 (see FIG. 14). Referring to FIG. 14, the first image of animation is an enlargement of icon 7206. CPU 300 further displays the movie of animation on movie display area 7500. Referring to FIG. 15, on movie display area 7500, animation images for the two-sided/one-sided copy for horizontal binding plus rotation by 180° are displayed one after another, first from (A) to (H) of FIG. 15, and thereafter from (H) to (A) of FIG. 15. By the animation images, the state of two images on one two-sided document to be printed on one side of two sheets of recording paper can be seen in detail. When the series of movie display ends, the animation images are erased from movie display area 7500.

After confirming the animation images for the two-sided/one-sided copy for horizontal binding, the user presses two-sided/one-sided key 7106. Here, it is assumed that check box 7400 is kept checked. When two-sided/one-sided key 7106 is pressed (YES at S1006), CPU 300 determines whether or not the pressed two-sided copy setting key and the state of check box 7400 are different from those of the last operation (step S1007).

Here, the pressed two-sided copy setting key is the same as the key pressed last time, and the state of check box 7400 is also the same as the last time. Therefore, CPU 300 makes a determination that the pressed two-sided copy setting key and state of check box 7400 are the same as those of the last operation (NO at step S1007). If it is further determined that the reset key has not been pressed within a prescribed time period (NO at step S1008), CPU 300 finally fixes the tentatively determined set contents related to two-sided copy, to be the two-sided/one-sided copy plus rotation by 180° as the two-sided copy function (step S1010). In the present embodiment, the reset key is a clear-all key 5104 displayed on task trigger area 5000.

If the reset key (in the present embodiment, the reset key is a clear-all key 5104 displayed on task trigger area 5000) is pressed by the user within a prescribed time period (YES at step S1008), CPU 300 finally fixes the two-sided copy function to the default setting of one-sided/one-sided copy (step S1009).

After changing the setting of two-sided copy function or functions, the user presses any of scan-in key 5102, monochrome start key 5106 or color start key 5108 displayed on task trigger area 5000. Thus, a desired process (scan-in process, monochrome copy process or color copy process) is executed.

In the operation described above, if the user presses one-sided/one-sided key 7100 or two-sided/two-sided key 7104, CPU 300 does not execute any special display process in accordance with the tentatively determined set contents. Therefore, nothing is displayed on movie display area 7500.

Figure 16:
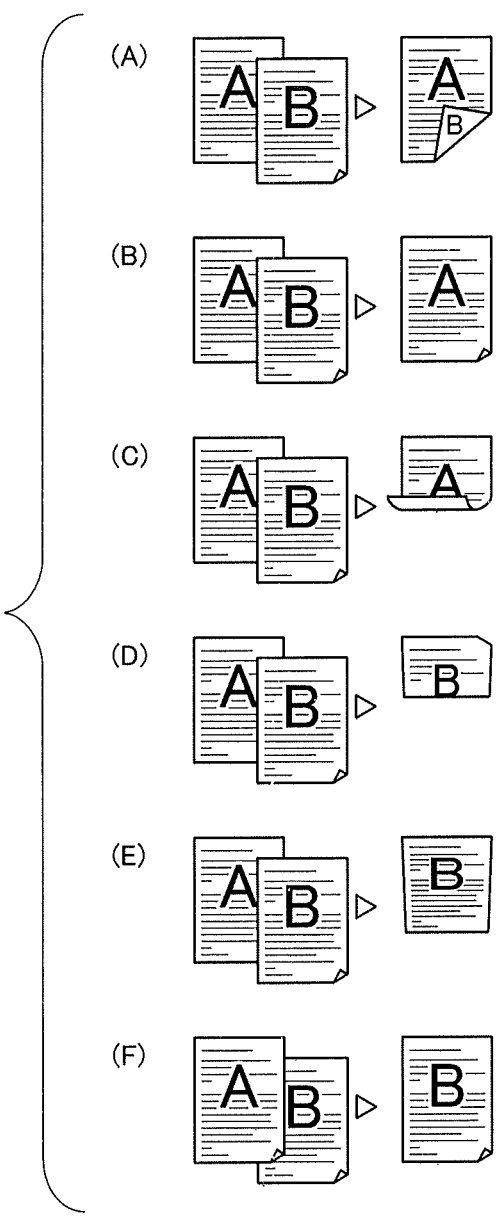
FIG. 16 shows a movie display of animation images representing one-sided/two-sided copy for vertical binding plus rotation by 180°.

In the above-described operation, if the user changes the setting of binding direction in advance (specifically, if vertical binding is set), CPU 300 reads images for the vertical binding as the corresponding animation images, and displays the images on movie display area 7500. By way of example, if the tentatively determined set contents are one-sided/two-sided copy for vertical direction plus rotation by 180°, CPU 300 reads animation images for one-sided/two-sided copy for vertical binding plus rotation by 180° from HDD 302, and displays the first image of the animation on movie display area 7500 (see FIG. 10). Referring to FIG. 10, the first image of animation is an enlargement of icon 7206. CPU 300 further displays the movie of animation on movie display area 7500. Referring to FIG. 16, on movie display area 7500, animation images for the one-sided/two-sided copy for vertical binding plus rotation by 180° are displayed one after another, first from (A) to (F) of FIG. 16, and thereafter from (F) to (A) of FIG. 16. By the animation images, the state of images to be printed on two sides of the recording paper can be seen in detail. When the series of movie display ends, the animation images are erased from movie display area 7500.

As described above, if the tentatively determined contents are one-sided/two-sided copy for horizontal binding, the image representing the state of recording paper after two-sided copy is rotated to the horizontal direction in the animation (see FIGS. 9 and 11). On the other hand, if the tentatively determined set contents are one-sided/two-sided copy for vertical, binding, the image representing the state of recording paper after two-sided copy is rotated to the vertical direction in the animation (see FIG. 16). Therefore, the user can easily understand the direction of page spread of the printed two-sided document.

<Function/Effect>

According to the embodiment above, operation unit 120 is an operation console provided on image forming apparatus 100 for executing a plurality of processes. On operation unit 120, display panel 132 displays two-sided copy setting screen image 7000 including a still image display area on which a plurality of software keys (two-sided copy setting keys 7100 to 7106) are displayed. The plurality of software keys correspond to respective ones of the plurality of processes (one-sided/one-sided copy, one-sided/two-sided copy, two-sided/two-sided copy and two-sided/one-sided copy), for selecting any of the plurality of functions. Touch-panel 134 receives input operations to the plurality of software keys. In response to an input operation on touch-panel 134, CPU 300 displays images representing the contents of selected process on movie display area 7500 different from the still image display area, on two-sided copy setting screen image 7000.

As described above, if any of the plurality of processes is selected, images representing the contents of selected process are displayed in a prescribed state on movie display area 7500 different from the still image display area. Therefore, the user can easily understand the contents of the selected process.

Further, according to the embodiment above, if any of one-sided/two-sided copy process and two-sided/one-sided copy process is selected, CPU 300 displays animation images representing the contents of selected process on movie display area 7500. Thus, the contents of selected process are displayed in detail and, the user can more easily understand the contents of selected process.

More specifically, when the one-sided/two-sided copy process is selected (when one-sided/two-sided key 7102 is pressed), CPU 300 displays images representing the state of images printed on two sides of recording paper, as the images representing the contents of selected process, in a movie (see FIGS. 9, 11 and 16). When the two-sided/one-sided copy process is selected (when two-sided/one-sided key 7106 is pressed), CPU 300 displays images representing the state of two images of one two-sided document-printed on one side of two sheets of recording paper, as the images representing the contents of selected process, in a movie (see FIGS. 13 and 15). Thus, the user can easily understand the contents of one-sided/two-sided copy and two-sided/one-sided copy that are hard to understand from icon displays. As a result, user convenience can further be improved.

Further, according to the embodiment described above, in the vicinity of two-sided copy setting keys 7100 to 7106 on the still image display area, icons 7200 to 7206 representing contents corresponding to the two-sided copy setting keys 7100 to 7106 are displayed. Therefore, by looking at ions 7200 to 7206, it is possible for the user to confirm the contents of processes corresponding to two-sided copy setting keys 7100 to 7106 before selecting a desired process. As a result, user convenience can further be improved.

Further, according to the embodiment above, the image representing the contents of selected process includes an image of enlarged icon 7202 or 7206, representing the contents of corresponding process (see FIGS. 8, 10, 12 and 14). Consequently, it becomes easier to grasp the contents of the selected process and, therefore, the user can more easily understand the contents of the selected process.

Further, according to the embodiment above, in response to touch-panel 134 receiving an input operation to two-sided copy setting keys 7100 to 7106, CPU 300 darkens the display color of icons 7200 to 7206. Consequently, if any of the plurality of processes is selected, it becomes easier for the user to notice the image representing the contents of selected process displayed in a prescribed state, rather than the icons 7200 to 7206. Therefore, the user can more easily understand the contents of the selected process.

When an input operation to two-sided copy setting keys 7100 to 7106 is received, corresponding icons 7200 to 7206 may be displayed in a prescribed less visually noticeable manner. Therefore, the present invention is not limited to the above-described embodiment in which the display color of icons 7200 to 7206 is darkened. By way of example, icons 7200 to 7206 may be erased. Alternatively, display density of icons 7200 to 7206 may be lowered.

Further, according to the embodiment above, on copy mode basic screen image 6000, a binding direction setting key (not shown) for adding a prescribed process (binding direction) to the selected process is displayed. On two-sided copy setting screen image 7000, check box 7400 for adding a prescribed process (180° rotated copy process) to the selected process is displayed. CPU 300 reflects the contents of added process to the animation images. Thus, the user can easily understand the contents of added process. This further improves user convenience.

Further, according to the embodiment above, movie display area 7500 is provided closer to the still image display area. Therefore, it becomes easier for the user to recognize the image representing the contents of the selected process.

Further, according to the embodiment above, image forming apparatus 100 is an image forming apparatus executing a plurality of processes including image processing on image data, including operation unit 120 as described above, image forming unit 104 executing the process selected by operation unit 120, FAX communication unit 160 and network I/F 304. Since image forming apparatus 100 includes operation unit 120, erroneous selection of a process (for example, erroneous copy) different from the process desired by the user can be prevented, and it is possible for the user to easily cause image forming apparatus 100 to execute the desired process.

<Modification>

In the embodiment above, if the tentatively determined set contents at step S1005 are one-sided/one-sided copy or two-sided/two-sided copy, nothing is displayed on movie display area 7500 and the corresponding icons 7200 and 7204 are displayed in a dark color. The present invention, however, is not limited to such an embodiment. By way of example, nothing may be displayed in movie display area 7500, and icons 7200 and 7204 may be displayed in the original manner of display (in a bright color).

Further, in the embodiment above, the animation images are displayed only once as a movie in a prescribed order. The present invention, however, is not limited to such an embodiment. The movie display may be repeated a prescribed number of times and then stopped.

Further, in the embodiment above, the images representing the contents of one-sided/two-sided copy process and two-sided/one-sided copy process are displayed as movies, to show the details of the corresponding process contents. The present invention, however, is not limited to such an embodiment. By way of example, difference in process contents may be indicated by changing the display color, and thereby the contents of corresponding process may be displayed in detail.

Further, in the embodiment above, no matter which of two-sided copy setting keys 7100 to 7106 is pressed, the animation images are displayed at substantially the same position. The present invention, however, is not limited to such an embodiment. The animation images may be displayed at any position easily recognizable by the user.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus that executes a plurality of processes, comprising:
    a display unit displaying a display screen image including a first area on which a plurality of virtual keys corresponding to respective ones of said plurality of processes for selecting any of said plurality of processes are displayed;
    a receiving unit receiving an input operation to said virtual keys;
    a first display control unit responsive to said receiving unit receiving said input operation, for displaying, on a second area different from said first area of said display screen image, an image representing contents of the selected process in a prescribed state; and
    a second display control unit for displaying, next to one of said virtual keys in said first area, an icon indicating contents of processes corresponding to the one of said virtual keys; wherein
    said image representing contents of the selected process includes an enlarged image of said icon indicating contents of the corresponding process.

2. The operation console according to claim 1, wherein said first display control unit displays said image representing contents of the selected process in a movie.

3. The operation console according to claim 1, wherein said second area is provided next to said first area.

4. An image forming apparatus executing a plurality of processes including image processing of image data, comprising: the operation console according to claim 1; and a process executing unit for executing a process selected by said operation console.

5. An operation console provided on an apparatus that executes a plurality of processes, comprising:
    a display unit displaying a display screen image including a first area on which a plurality of virtual keys corresponding to respective ones of said plurality of processes for selecting any of said plurality of processes are displayed;
    a receiving unit receiving an input operation to said virtual keys;
    a first display control unit responsive to said receiving unit receiving said input operation, for displaying, on a second area different from said first area of said display screen image, an image representing contents of the selected process in a prescribed state; and
    a second display control unit for displaying, next to one of said virtual keys in said first area, an icon indicating contents of processes corresponding to the one of said virtual keys; wherein
    said second display control unit includes a display changing unit, responsive to said receiving unit receiving said input operation, for displaying said icon in a prescribed less visibly recognizable manner, or easing said icon.

6. An operation console provided on an apparatus that executes a plurality of processes, comprising:
    a display unit displaying a display screen image including a first area on which a plurality of virtual keys corresponding to respective ones of said plurality of processes for selecting any of said plurality of processes are displayed;
    a receiving unit receiving an input operation to said virtual keys;
    a first display control unit responsive to said receiving unit receiving said input operation, for displaying, on a second area different from said first area of said display screen image, an image representing contents of the selected process in a prescribed state;
    an adding unit for adding a prescribed process to said selected process; and
    a reflecting unit for reflecting contents of said added process to the image representing the contents of said selected process.

7. An operation console provided on an apparatus that executes a plurality of processes, comprising:
    a display unit displaying a display screen image including a first area on which a plurality of virtual keys corresponding to respective ones of said plurality of processes for selecting any of said plurality of processes are displayed;
a receiving unit receiving an input operation to said virtual keys;
a first display control unit responsive to said receiving unit receiving said input operation, for displaying, on a second area different from said first area of said display screen image, an image representing contents of the selected process in a prescribed state; wherein
said plurality of processes include at least: a one-sided/two-sided copy process for forming a two-sided copy from a one-sided document; and a two-sided/one-sided copy process for forming a one-sided copy from a two-sided document;
said first display control unit executes at least one of
a process for displaying, in response to said receiving unit receiving an input operation to the virtual key corresponding to said one-sided/two-sided copy process, images representing a state of images printed on two sides of a sheet of recording paper, as images representing contents of said selected process, in a prescribed state, on said second area; and
a process for displaying, in response to said receiving unit receiving an input operation to the virtual key corresponding to said two-sided/one-sided copy process, images representing a state of two images of one two-sided document respectively printed on one side of two sheets of recording paper, as images representing contents of said selected process, in a prescribed state, on said second area.

8. An operation console provided on an apparatus that executes a plurality of processes, comprising:
a display unit displaying a display screen image including a first area on which a plurality of virtual keys corresponding to respective ones of said plurality of processes for selecting any of said plurality of processes are displayed;
a receiving unit receiving an input operation to said virtual keys;
a first display control unit responsive to said receiving unit receiving said input operation, for displaying, on a second area different from said first area of said display screen image, an image representing contents of the selected process in a prescribed state; wherein
said plurality of processes include at least: a one-sided/two-sided copy process for forming a two-sided copy from a one-sided document; and a one-sided/one-sided copy process for forming a one-sided copy from a one-sided document; and
said first display control unit displays, in response to said receiving unit receiving an input operation to the virtual key corresponding to said one-sided/two-sided copy process, images representing a state of images printed on two sides of a sheet of recording paper, as images representing contents of said selected process, in a prescribed state, on said second area.

9. A method of controlling an operation console provided on an apparatus that executes a plurality of processes, comprising the steps of:
displaying a display screen image including a first area in which a plurality of virtual keys corresponding to respective ones of the plurality of processes for selecting any of said plurality of processes are displayed;
receiving an input operation to said virtual keys;
displaying, in response to reception of said input operation, on a second area different from said first area of said display screen image, an image representing contents of the selected process in a prescribed state;
displaying, next to one of said virtual keys in said first area, an icon indicating contents of processes corresponding to the one of said virtual keys; wherein
said image representing contents of the selected process includes an enlarged image of said icon indicating contents of the corresponding process.

10. The control method according to claim 9, wherein said display in a prescribed state is display in movie.

11. A method of controlling an operation console provided on an apparatus that executes a plurality of processes, comprising the steps of:
displaying a display screen image including a first area in which a plurality of virtual keys corresponding to respective ones of the plurality of processes for selecting any of said plurality of processes are displayed;
receiving an input operation to said virtual keys;
displaying, in response to reception of said input operation, on a second area different from said first area of said display screen image, an image representing contents of the selected process in a prescribed state;
displaying, next to one of said virtual keys in said first area, an icon indicating contents of processes corresponding to the one of said virtual keys; wherein
said step of displaying said icon includes the step of displaying said icon in a prescribed less visibly recognizable manner, or erasing said icon, in response to said receiving unit receiving said input operation.

12. A method of controlling an operation console provided on an apparatus that executes a plurality of processes, comprising the steps of:
displaying a display screen image including a first area in which a plurality of virtual keys corresponding to respective ones of the plurality of processes for selecting any of said plurality of processes are displayed;
receiving an input operation to said virtual keys;
displaying, in response to reception of said input operation, on a second area different from said first area of said display screen image, an image representing contents of the selected process in a prescribed state;
adding a prescribed process to said selected process; and
reflecting contents of said added process to the image representing the contents of said selected process.

13. A method of controlling an operation console provided on an apparatus that executes a plurality of processes, comprising the steps of:
displaying a display screen image including a first area in which a plurality of virtual keys corresponding to respective ones of the plurality of processes for selecting any of said plurality of processes are displayed;
receiving an input operation to said virtual keys;
displaying, in response to reception of said input operation, on a second area different from said first area of said display screen image, an image representing contents of the selected process in a prescribed state; wherein
said plurality of processes include at least: a one-sided/two-sided copy process for forming a two-sided copy from a one-sided document; and a two-sided/one-sided copy process for forming a one-sided copy from a two-sided document;
said step of displaying the image representing contents of said selected process in a prescribed state includes at least one of the steps of
displaying images representing a state of images printed on two sides of a sheet of recording paper as images representing contents of said selected process, in a prescribed state, on said second area, in response to reception of an input operation to the virtual key corresponding to said one-sided/two-sided copy process; and displaying images representing a state of two images of one two-sided document respectively printed on one side of two sheets of recording paper as images representing contents of said selected process, in a prescribed state, on said second area, in response to reception of an input operation to the virtual key corresponding to said two-sided/one-sided copy process.

14. A method of controlling an operation console provided on an apparatus that executes a plurality of processes, comprising the steps of:

displaying a display screen image including a first area in which a plurality of virtual keys corresponding to respective ones of the plurality of processes for selecting any of said plurality of processes are displayed;

receiving an input operation to said virtual keys; and displaying, in response to reception of said input operation, on a second area different from said first area of said display screen image, an image representing contents of the selected process in a prescribed state; wherein said plurality of processes include at least: a one-sided/two-sided copy process for forming a two-sided copy from a one-sided document; and a one-sided/one-sided copy process for forming a one-sided copy from a one-sided document; and at said step of displaying the image representing contents of said selected process in a prescribed state, images representing a state of images printed on two sides of a sheet of recording paper are displayed as images representing contents of said selected process, in a prescribed state, on said second area, in response to reception of an input operation to the virtual key corresponding to said one-sided/two-sided copy process.

* * * * *